(12) United States Patent  (10) Patent No.: US 7,725,499 B1
von Lepel et al.  (45) Date of Patent:  May 25, 2010

(54) SEMANTIC ARCHITECTURE FOR MANAGING INFORMATION THROUGH STRUCTURED STORAGE AND RETRIEVAL

(75) Inventors: Florian von Lepel, Ramsen (CH); Stephan Finkler, Ramsen (CH)

(73) Assignee: Star AG, Ramsen (CH)

( * ) Notice: Subject to any disclaimer, the term of this patent is extended or adjusted under 35 U.S.C. 154(b) by 466 days.

(21) Appl. No.: 11/701,112

(22) Filed: Feb. 1, 2007

(51) Int. Cl.
*G06F 7/00* (2006.01)
(52) U.S. Cl. .................. 707/803; 707/791; 707/793; 707/802; 707/807; 707/811
(58) Field of Classification Search ............. 707/802, 707/803, 807, 811, 791, 793; 709/245, 247
See application file for complete search history.

(56) References Cited

U.S. PATENT DOCUMENTS

2002/0010798 A1* 1/2002 Ben-Shaul et al. .......... 709/247
2004/0181544 A1* 9/2004 Anderson ................ 707/102
2005/0086256 A1* 4/2005 Owens et al. ........... 707/103 R
2006/0167911 A1* 7/2006 Le Cam .................. 707/101

* cited by examiner

*Primary Examiner*—Don Wong
*Assistant Examiner*—Tuan-Khanh Phan
(74) *Attorney, Agent, or Firm*—ColterJennings

(57) ABSTRACT

A unified system for the structured collection, management, translation, and publication of multi-lingual information that is based on industry standards for information structures. Self-contained information units are stored in a single source and mapped onto a multiple dimensional data matrix in which the axes represent information types, objects, variants, and language. Linking through the matrix to a unique storage location for information facilities data entry, editing, access control, quality control, and automated publication of stored information.

29 Claims, 8 Drawing Sheets

SEMANTIC ARCHITECTURE FOR MANAGING INFORMATION THROUGH STRUCTURED STORAGE AND RETRIEVAL

FIELD OF THE INVENTION

The present invention relates generally to a system for structured storage and retrieval of information requiring multi-lingual output.

BACKGROUND

Globalization of the world economy has brought about a strong demand for automated information management that includes multilingual documentation. Throughout the world, business and industry encounters an ever-increasing need to provide consistent documentation for products and processes that are rapidly evolving and to do so in multiple languages. Traditionally, some computer-assisted document management and translation tools have been used to facilitate these processes. However, there has been little integration of comprehensive end-to-end documentation management to provide a uniform process for information management from the creation of data to its publication in myriad formats and various languages.

The constantly-increasing flood of information must be organized with an intelligent, effective information management system so that users of data can distinguish important from unimportant information specific to their needs and ensure the reliability of the information. It is significant that in the industrial world, information is the only production factor that can be duplicated easily, that can be used simultaneously in several locations, and that is not consumed with use. These positive attributes stand in contrast to the fact that information can easily be changed along the way from the creator of data to its ultimate consumer, which calls its reliability into question.

Traditional approaches to information management have attempted to address this problem by version controlled consumer-oriented documents. However, attempts to manage multiple versions ensures a proliferation of inconsistent versions and multiplies the complexity of managing what is essentially a multi-dimensional information matrix of uses, components, languages, and other factors. Control of document versions also allows subsequent users of data to inappropriately change content and relationships mandated by the creator of the information. It also multiplies the time required to deliver information to users in an accurate and useful format.

In order to ensure the timeliness, reliability, and consistency of information in a multi-lingual production or marketing environment, a system is required that supports management of the information from its generation by authors during the collection or creation of their information through updating, editing, translation and final publication and distribution of properly formatted information in the appropriate format for the targeted end-user. Only a unified system that enforces quality and uniformity—and that preserves the accuracy and proper context of information during the entire process—is capable of addressing these real-world information management dilemmas. Traditional systems, including those based on document version control, often provided for multiple instances of the same data to be stored and independently changed. Moreover, in traditional approaches the context and usage details of data are not stored with the data itself giving rise to ambiguity with regard to the purpose and use of data, and further giving rise to inconsistency in usage, terminology, and translation paradigms.

The present invention overcomes these limitations by managing the creation of highly granular units of qualified information that is stored in a common repository and is separated from any specific document format or structure, enabling the publication of information in any format or structure. The invention also facilitates the use of industry-specific templates that ensure appropriate and consistent use of information. This system enables the comprehensive use of synergies in the collection of information and guarantees the accuracy and timeliness of information, including multiple translations, without continual editing and re-editing of the same information.

SUMMARY OF THE INVENTION

The current invention describes a unified system for the structured collection, management, translation, and publication of information that is based on industry standards for information structures, including Standard Generalized Markup Language (SGML) and/or eXtensible Markup Language (XML) technologies. The invention is distinguished from other technologies by a transparent management system for storing content consisting of self-contained information units stored in a single source. Templates define the structure of the information contained in an information unit which is required to manage the information.

The invention characterizes data in a unified manner by placing the information units in a multi-dimensional information model. The information model is a matrix comprising multiple axes that define relationships. An information type axis governs interrelationships by characterizing information in the data structure according to independent information types that are defined based on the specific needs of the user or industry. Information types may include tasks, technical data, or other characteristics associated with a specific use or industry. The information type axis may assume a tree structure with main and subordinate characteristics described in a hierarchical format. The information type definition describes a semantic structure that includes specification of (i) anchor points which can serve as the basis for links; (ii) links which connect to such anchor points; and (iii) on or more independent anchor axes that allow pooling of anchors.

A second axis in the multi-dimensional data array is the object axis, which may also assume a tree structure with main and subordinate levels defined as required by the specific use or industry. The object axis will typically define different products or product categories. Thirdly, a variant axis defines different versions of the products described on the object axis. This axis may also assume a tree structure with multiple levels defining variants and sub-variants as required. Finally, a language axis provides for structured management of multi-lingual versions of the information available from the matrix. It also facilitates computerized automation of consistent translation, avoidance of redundancy, and consistent formatting for automating final publication in different languages.

Based on the described semantic structure, stored information is dependent only on the matrix address where it is originally stored. The information model ensures that original information is stored at a single address, so that any other instances where that information is used are based on links to the primary address. Links between information types, thus create an information model that captures relationships and thus defines a semantic structure that can be traversed to manipulate the data.

The storage repository for the structured information units is typically a relational database, but other data and file structures, including hierarchical databases, object data structures, or even flat files may be used. The information units stored in these structures can be used multiple times and linked with one another. Linking eliminates the need for redundant storage and facilitates the accurate documentation of information relationships at each stage of information management from data collection to final publication to a targeted end-user.

The information model facilitates structured control of rights to originate information and rights to access information. This is important because traditional information management systems, based on versioning, make it difficult to confine the entry and editing of information to those who have the requisite knowledge. Under the information model described by the invention, the origination of information units can be limited to those who control the actual products or processes described by the data, such as a design engineer. The multi-axis structure and linking capability ensures that the data is independent from its reuse by consumers and for ultimate publication.

Access control is further enhanced by providing an attribute and status characteristic for each information unit. An attribute may define how the information was generated, such as whether it was manually entered, converted, translated, or exported. Each information unit also has a status that defines its quality at the appropriate stage of entry or use. Information needs to be changed or updated only if the quality changes as defined by its status. The status characteristic will indicate who entered the data, checked it, translated it, etc. and what result they reached in that role such as whether it is approved for translation or publication. Thus data is not changed based on where and how it is used. Data remains linked into the semantic structure. This allows the data links to remain independent of any version of the linked information.

Each time information is used, a decision about quality has to be made to determine whether the information is ready for such use, such as editing, proof-reading, or approval for publication. The status characteristic makes this possible. At the same time, the anchor link is independent of status so that the link does not have to be updated when the status changes. This provides a clear advantage over systems in which links must be updated to reflect each change in status of the document.

The object and variant axes are determined based on a developers view of the product or process, rather than being driven by the view of a consumer of the information. Because information is stored in accordance with the way a product is actually engineered, this model comprises a true information management tool rather than a mere document management tool. The information units stored in the information model describe that actual product or process rather than an after-the-fact interpretation of the information by a person charged primarily with formatting the data. At the same time, this frees the data originator from the duty to manage formatting and publishing.

For example, an information unit that describes an assembly process may be linked with the information unit describing a tool that is required for a particular step of that process. Each of the two information units is self-contained with respect to its content. The assembly instruction describes all necessary steps for the assembly process and the tool description contains all technical details for that particular tool. By using a data link, the assembly process can directly access the related tool data and provides cross-references for the use of a tool found in the tool description.

This example also demonstrates that the information units can be divided into various classes such as an assembly instruction or tool description. Each class corresponds to an information type, which may be specific to a particular industry or business model.

The information type includes those characteristics that possess the necessary content components for understanding the information. Structured information typing ensures that all information units of a given information type have the same content structure. This principle guides the author during research, collection, and entry of data and guarantees that users will find only complete and consistent content when accessing an information unit for use in performing their roles (such as editing or translation) and that the final published representation of that information, such as an instruction or repair manual is complete and consistent. This type of content designation of the individual information components together with the relationship between information components creates a hierarchical information model that brings intelligence to the database itself which, in turn, enables a higher degree of automation of related processes, including verification, evaluation, translation, revision, and final publication of the information.

Separation of the documentation management from information accuracy management allows focus on the information itself as opposed to assuming its accuracy and focusing on documentation and formatting. This capacity is further enhanced by the linking of information units that eliminates redundancy and avoids the need for any corrections or revisions to be inserted at multiple points. Only the required changes are made, which then propagate themselves through the full management cycle of the documentation, including checking, translation, proofing, and final publication.

The linking concept is further strengthened by using layer links that allow the projection of data to a different address range within the information model. The layer link is a mechanism for avoiding data redundancy, in that the data of one address range is projected into another. Through this mechanism, in the simplest case a matrix address, that is, a single cell in the data structure, can be projected to another. The most complex case permits the projection of a three-dimensional address range. The projection relates to the matrix addresses and not to the actual information units, making it independent of the entry or correction of the projected data. The layer-linking concept is driven strictly by the development view of the product or service being modeled, not by the view of the consumer or formatter of the information.

The status of the information contained in the information model is always available, providing an accurate and up-to-date picture of the information. All changes in either content or the status of an information unit is time-stamped to provide a historical view of the progress of the data from entry through all steps required for final use or publication.

The information model also facilitates the storage of publication definitions which are analogous to the style-sheets used by other publication tools. The data structure accommodates a full layout component definition or LCD. The LCD comprises all information required to format and publish each type of document in the required form for designated media, which may be paper, CD or other digital media, or on-line. Fonts, distances, breaking rules, and language-specific parameters such as punctuation conventions are all embodied in the LCD.

One of the key benefits of the multidimensional data structure described by the invention is the inclusion of a language axis to facilitate the management of the same information in multiple languages. This structure accommodates the use of translation memory technology as is known in the art. In addition, the model specifically facilitates the use of language pairs to avoid redundant translation of the same information and consistency of usage.

To translate information, the information model facilitates integration with computer assisted and automated translation modules. Each information unit can be accurately translated independent of other information units, because its context is precisely defined by the axes and its information is self contained. With automated control of the translation process, only those information units that are required for a particular target publication are output for translation. The content-structured information units can, where required, be transformed by the system (such as conversion into alternative measurement systems) or pre-translated based on the native translation memory system that comprises part of the invention. The use of intelligent information types allows consistency in the automated aspects of translation and facilitates re-use of pre-existing translations of information that uses the same information structure type. Information units that cannot be translated on a fully-automated basis are prepared for translation with the help of translation memory systems so that the translator only has to process the content that has not yet been translated in the proper context. Each translated information unit is imported by the system and designated as the language pair of the information unit in the source language. This way, it is possible to tell at any time whether or not there is a valid translation of an information unit. The system saves all data using industry-standard Unicode, allowing translations to use all currently-known alphabets and styles of lettering—including Asian, Middle Eastern and Eastern European characters.

Editing of data, including the translation of data into multiple languages is enhanced by a heuristic "mind-reader" system that anticipates the editor's requirements and draws upon prior data entry to expedite those needs. The mind-reader uses contextual analysis and pattern recognition to classify a current editing task and to retrieve prior instances of similar usage. Samples from such prior usage, such as translated material from a different language, are then presented to the editor for selection and further editing. Once completed, the editing task also becomes available for retrieval in contextual searches of future edits. Thus, the volume and accuracy of available data increases with continued use, automatically building a library of intelligent, automated editing tools.

In summary, the modular approach to information management embodied in the invention permits high productivity since essential process steps, including complex ones such as translation and publication, can be carried out partially or completely automatically. As a result, the author of information has great responsibility and must work in disciplined fashion during the collection and management of content. Numerous tools are integrated into the system to enforce the necessary structure and discipline in collecting and entering information in order to be able to generate a high-quality database. In the end, the quality of the database determines the quality of the output.

The system described by the invention has broad application as a universal product-intelligence tool for industrial, commercial and government enterprises. It facilitates accurate and consistent development of specifications and requirements at the design or development stage, the creation of production documents such as work instructions or adjustment guidelines, and the final product documentation including user manuals, online help, and product catalogues. Organizational and process related documents reap similar benefits with the ability to automate status reports, performance specifications, diagnostic processes, and end-user inquiry responses.

Using the single-point-of-storage principal and linking to avoid redundancy, information need be created only once after which it can be managed intelligently with a maximum of automation. Finally the system enables documentation to be published in accordance with emerging and current industry standards such as ATA2000, ATA2001, AECMA SPEC 1000D, SAE J2008, Mumsay, and others.

BRIEF DESCRIPTION OF THE DRAWINGS

Other features and advantages of the present invention will be apparent from reference to a specific embodiment of the invention as presented in the following Detailed Description taken in conjunction with the accompanying Drawings, in which.

DETAILED DESCRIPTION

Basic Principles and Definitions

Figure 1:
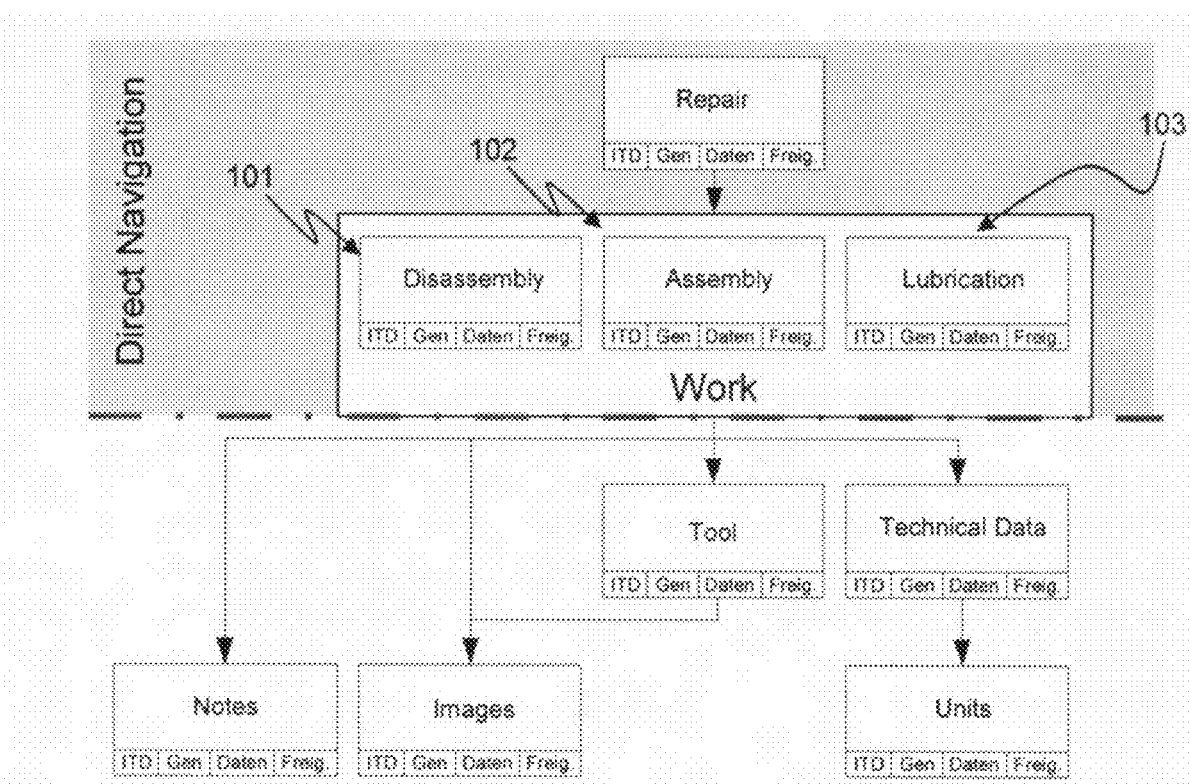
FIG. 1 depicts an example of an informational model applicable to bicycle repairs.

According to the present invention, a method is provided that presents a unified system for the structured collection, management, translation, and publication of information, effectively comprising a service or product-intelligence tool. The invention employs industry standards for information structures, including Standard Generalized Markup Language (SGML) and/or eXtensible Markup Language (XML) technologies. The invention facilitates structured management of the constantly-increasing flood of information in industry, business, educational, government and other environments that must be organized with an intelligent, effective information management system in order to enable users to distinguish important from unimportant information and ensure the reliability of the information. In the end, current, complete, and reliable information is the basis for making correct decisions. The invention provides tools to create and manage a structured information system that ensures that information is current, complete, and accurate and then facilitates if publication across any pre-determined number of user requirements and languages.

Information is the only production factor that can be duplicated easily, used simultaneously in several locations, and that is not consumed with use. These positive attributes stand in contrast to the fact that information can easily be changed along the way from author to user, which results in multiple points where its currency and reliability may be compromised. Ensuring currency and accuracy is, for many classes of users the most critical factor to operational success as information represents the user's technical and organizational expertise.

In order to ensure the timeliness and reliability of information, the invention presents a system that (i) supports developers, authors and other originators or information during the collection of that information; and (ii) combines the necessary information for users according to their needs. The fundamental axioms of the system are as follows:

(1) The information is stored in the manner of its creation and not in the manner of its possible later use.
(2) Depending on the needs of the information consumer the data could be retrieved in different formats and combinations.
(3) The information can only be stored in one place.
(4) All necessary details must be self-evident. This permits purposeful storage and retrieval of information even if the user in question is not the author.
(5) The system must prevent the redundant storage of information. This reduces the data volume to be managed and the maintenance effort required for updating.
(6) The information must be managed in a common data source so that all users access the same database. This enables synergies in the collection of information and guarantees the originality and timeliness of information. It also ensures that all intermediate changes to the information can traced with continuous editing in different places according to the principle of the "silent post" as is known in the art.

To achieve these objectives, the invention provides a continuous system for the structured collection, management, and publication of multilingual information, stored in a database (which may be a relational database as is known in the art) and which is based consistently on SGML/XML technology as known in the art. Stylistic structures may be managed using DSSSL (Document Style Specifications and Semantic Language) or XSLT (Extensible Style sheet Language Transformation) standards.

The markup language SGML (Standard General Markup Language) was developed for the type of information management described above; in 1986 it became an ISO standard. Since then, SGML has been an internationally-established publisher, hardware and software-independent standard for information management. SGML implements the separation of structure, format, and layout of a document consistently. An SGML document always consists of two components that can be put into any output format with any layout process. First, the Document Type Definition (DTD) comprises the rules that reliably specify hierarchical information structure of a class of documents (e.g. of a report). Here the content or layout-describing components are named and defined in their sequence and frequency. Second, the Document Instance contains the actual contents of a concrete document with structuring and descriptive additional information—the SGML elements and attributes—that designate the content semantically and thus enable the computer to interpret them. The structure of the document instance must always correspond to the rules of a Document Type Definition.

All data of an SGML document are saved in a text format. Originally, all SGML data is saved in simple ASCII character (7-bit) format. In the meantime, the data is also saved in extended ASCII characters (8-bit) and on through to Unicode characters (2 bytes) as is known in the art. Unicode is a system with which it should be possible to code the characters of all known writing systems. This system enables each coded character to be stored by a computer. The prerequisite is that the computer or the program executed must support the Unicode system.

As known in the art, characters are catalogued by classes. In addition to characters, mathematical formula characters, punctuation marks, and functional characters such as syllable divisions, forced spaces, and tab characters can be collected and expressed in Unicode. Together with the character code, particular properties of the character are also documented (e.g. the direction of the writing, upper/lower-case letter, etc.). The Unicode characters are defined in the data as numeric notation and have one either a decimal format: Õ or a hexadecimal format (with x): ╪. The individual character codes can be determined from standard Unicode character tables.

The coded display of the character does not facilitate actual publication of a readable document. As with other coded character sets, a printing font is required for the display of the characters a font in which the geometry of the character is managed according to the Unicode designation. The invention supports the complete Unicode set during data management. The required displays can be combined from existing fonts from public domain and commercial sources using font compositions.

This data format system permits a location and platform-spanning data exchange. All special characters that are not contained in the ASCII format can be defined as entities. Thus the data that is managed according to the SGML concept is available over a longer period; that is, the lifespan of the SGML data is greater than that of a software version. Users can work independent of proprietary data formats.

The markup language XML was derived from the SGML mechanisms. Some complex components of SGML were peeled away in order to achieve simpler and more cost-effective dispersal of the underlying method. A significant drive for this development is the exchange and spread of information via the Internet.

DSSSL (Document Style Specifications and Semantic Language) or XSLT (Extensible Style sheet Language Transformation) are languages in the SGML/XML landscape with which the collected content can be converted into an output structure for formatting and for layout processes.

The invention consistently applies the described technologies in their original form. There are no unnecessary conversions into other formats for internal processing.

The invention is distinguished by a transparent management system for storing content consisting of self-contained information units using the single-source principle. Effective maintenance and management of information can be achieved with a purposeful organization into self-contained content information units. Each information unit can be assigned to precisely one class of information—a so-called information type. Each information type has a typical content structure that is specified by a document type definition. This way, it is possible to achieve a transparent modularization of the database with logically-traceable modules.

This type of information collection presents an innovative mode of operation that is completely independent of the layout. The benefits of this procedure greatly outweigh the burdens of conversion to the method. First, the information units can be collected taking advantage of division of labor (department and location-spanning). It is possible to collect the information from its source of origin. Information may originate from the primary source such as a developer, engineer or author, rather than being harvested after the fact by a technical writer or other documentation specialist. This guarantees data timeliness and quality since transmission errors are excluded using the "silent post" approach. The content-identical structure of an information type guarantees a standardized content level and consistency of the collected information.

Second, the information units can be updated or changed independent of one another. Processing of any information unit is therefore only necessary if its content has actually changed. The significance of an information unit in the database is transparent with respect to any individual user's area of responsibility.

Third, the individual information units can be linked to form an intelligent information network and thus reused multiple times without actual replication. Thus the redundancies typical in document management can be reduced to a minimum.

In the invention, the documentation-relevant information is partitioned into individual self-contained content information units. These are assigned individual components of the product to be documented, the variant, and the language. In this manner responsibilities for various aspects of the database can, be determined clearly and the advantages listed above can be used effectively.

The information units managed can be used multiple times and linked with one another to form a hierarchical information model. By using links, redundancy and replication of information is avoided and information-technical relationships are automatically documented. The linked information unit specifies the circumstances of the referencing information unit.

For example, the information unit that describes an assembly process is linked with the information unit of a tool that is required for a particular assembly step. Each of the two information units is self-contained with respect to its content. The assembly instruction describes all necessary steps for the assembly process, while the tool description contains all technical details for a particular tool. With the link, there is access to the tool data in the assembly instruction and a cross-references for the use of a tool in the tool description.

This example demonstrates that the information units can be divided into classes such as an assembly instruction or a tool description. Each class corresponds to an information type. The characteristics of each information type define the necessary content components for understanding the information unit. This means that all information units of an information type have the same content structure. This principle supports the author during research and collection of the initial data and guarantees users the completeness of the content of an information unit through to final publication by ensuring that each content component is populated and by tracking any changes made following the original data entry. The content designation of the individual information components brings intelligence to the database, which in turn enables automation of additional functions such as editing, evaluation, translation, and intelligent publication.

Depending on the information type, the content of the information units is collected either with the help of the invention's native editor or with special forms designed to ensure population of all content components. Upon completion of the content editing, the edited information unit can be assigned a status that documents its degree of content maturity. In the freely-configurable status model, any editing status can be defined (e.g. check language, check content, in translation, or released). Via status-dependent rights, access rights to an information unit can be assigned depending on its current processing status.

These functionalities permit a division of labor across two dimensions. First, different information types can be populated by different authors (e.g. technical data can be entered directly by the developer). Second, an information unit can be corrected or optimized by users that are assigned specific responsibilities (e.g. Editor or translator) depending on the unit's processing status as described above.

The information units collected can be translated to meet specific requirements, such as those required in different types of publications. With automated control of the translation process, only those information units that are required for the publication, and that are not yet available in translation, are output for translation. The content-structured information units can in some cases be transformed by invention itself, such as conversion of measurement units from one system to other). Information that is used on a repeated basis may also be pre-translated. Information for which translation has not already been performed and that does not match any of the criteria for pre-determined automatic translation is then prepared for translation with the help of a translation memory system, as is known in the art, so that the translator only processes the content that has not yet been translated in its context. A language pair-based translation is undertaken with translation memory software. This means that linguistic segments (e.g. a sentence) are stored in pairs during translation so that an already-translated sentence is translated automatically in case of repetition.

Each translated information unit is imported by the invention and designated as the language partner of the information unit in the source language. This approach enables the user to determined, at any time, whether or not there is a valid translation of a specific information unit. The invention saves all data using standard Unicode, enabling consistent management of translation to all currently-known alphabets, syllabaries, or ideographic systems, including Asian and Eastern European characters.

The information units collected and translated can be output automatically by using pre-determined publication mechanisms. Each publication mechanism is defined in a publication type. A publication type characterizes a particular format for the content matched to the target medium and the purpose of the information, the purpose being the nature of use of the information by a target group of end users. This means that in addition to adjusting the formatting, the actual structure of the content may be controlled and designed differently. For example, a publication type, acting as a template, may generate from the same selected information unit a detailed paper document such as an operator's manual. Another template generates thematically-organized browser displays in XML or HTML for presentation on the Internet. Other templates may format the same data for a CD application or a context-sensitive, on-line help file (such a *.chm—Microsoft Compiled HTML—format file as is known the art). A different type of template may provide for data export in a structured text file, for data exchange with another system that reads files so formatted. Since the publication process runs completely automatically, a uniform documentation system with respect to information depth, handling, and corporate design is ensured.

The divided-up information collection and the system structured in detail permit high productivity since essential process steps, including the normally labor-intensive steps of translation and publication, can be carried out partially or completely automatically. This requires the original author of information to exercise great care and assume responsibility for accuracy during the collection and management of content. The invention integrates a set of tools that support the editor in collecting information in a disciplined fashion in order to be able to generate a high-quality database. In the end, the quality of the database determines the quality of the output.

Technical products, such as machinery and software, projects, and the results of research are subject to constant further development. The new knowledge that arises this way must be documented continuously, whereby in many cases the changes over time are significant. The same claim can be made for high-quality documentation, which achieves an approved publication status across different degrees of maturity from the information collection to linguistic and technical checking. Here too the changes over time and adherence to the prescribed steps must be documented.

The invention provides robust history management for each individual information unit from its creation through to final publication. Even if the information unit is deleted, all its previous statuses are retained.

The invention' history management system documents who (e.g. editor or system), when and what workstation made a content change or set a new processing status. With the differential comparison function described below, the difference between two states can be traced at any time. In addition users can view the actual content of the information unit of a past processing status or temporarily reset the entire database back to a point in the past. This allows the repeated publication of a document with precisely the same data that were collected at that point in time.

The history tracking functionality also helps to ensure the accuracy of current data. Because the history is tracked by assigning a time stamp for the addition, deletion, modification, or change in status of data in any information unit, when a new document is created, it may be populated by linking to the most recent available data, based on the time stamp, provided the data is compliant with a predetermined status. Thus, the most recent reliable data that is no longer pending review, verification, edit or translation can be automatically located and linked, ensuring that each publication contains the latest approved content.

Related to the history tracking function is a fuzzy logic system that enables the real-time retrieval of previously entered information during user input. Because the full history of each information unit is available, any previously entered information can be reused regardless of it's currency. Using fuzzy-logic algorithms, known in the art, to locate contextually consistent prior data, permits the user to select all or portions of such previously entered data to avoid recreation of existing information, automate new data entry, and ensure consistency of expression and to facilitate automated translation.

The Information Matrix

The invention's matrix is the central component of the software for administration of the database and the core of the user interface for navigation within the database. The matrix provides functions for configuration of the management system, configuration of user rights, searching within the database, import of externally-provided information units, control of the translation process, control of the publication process, and administrative queries.

In providing functionality for configuration of the management system, the database is managed for all users using a four dimensional matrix. The four primary dimensions or axes are (1) the information types axis (2) the object axis defining product (or service) structure, (3) the variant axis, describing variations of each product, and (4) the linguistic axis providing the same information in different languages. An additional anchor axis may be implemented to allow pooling of related information elements for consolidated handling of a range of data described by the other axis dimensions. Together these axes—and the relationships they define—constitute a full information model comprising a product-intelligence engine.

Users navigate in the database by selecting information units to be edited from a data cube in a transparent manner. Users will find content-related information in direct proximity due to the linking characteristics described above. In working with the invention users classify the information with respect to its content before they create the content. Classification occurs automatically through navigation of the data structure according to the four primary management axes.

User rights may be freely configured to meet specific predetermined requirements for data management. In the four dimensions of the management system, different rights for user groups and users can be defined for different substantive areas. The rights can be defined across the entire database on through to an individual information unit and further to take into account the current processing status of an individual information unit or any body of information units. This approach ensures that only the originators of data elements are allowed to enter or modify information in accordance with their assigned responsibilities. Editing, proof-reading, translating, and formatting functions may be assigned granularly so that each user's access is limited to the assigned role.

Robust searching capabilities are inherent in the underlying database storage mechanism, which may be a relational database as known in the art. The spectrum of search possibilities ranges from the structured search for individual information units to the limited selection of information units with particular characteristics on through to the full-text search on the actual content of the entire database.

The matrix structure also facilitates management of the importation of externally-provided information units. If information units are provided by external systems, they can be imported into the database with the import function. Examples may include information on components or services provided by a supplier or sub-contractor.

The matrix structure described by the invention facilitates the mapping of information storage onto the real-world processes by which a product or service is created, modified, used, and maintained.

This real-world mapping commences with information-type axis which governs interrelationships by characterizing information in the data structure according to independent information types that are defined based on the specific needs of the user or industry.

FIG. 1 depicts in graphical format an example of an information-type that might be used by a bicycle manufacturer to address repair procedures. This example takes one type of information—a task—and demonstrates how all relevant information is related in logical structure and sequence. The task in this case is repair of the bicycle. Sub-elements of the repair task include disassembly 101, assembly 102, and lubrication 103. These information types would be defined by the engineer or technician with the appropriate knowledge and would thus reflect the actual requirements of the product. The task of repair includes not only the sub-elements of the task, but includes links to notes (such as step by step instructions), images, tools required, technical information (such as a torque setting), and the units of such technical data (metric or English, for example).

Classes on the information type axis may include materials, tools, tasks, technical data, or other characteristics associated with a specific use within the target industry. The information-type axis may include sub-categories of each defined information type to an arbitrary depth of granularity described in a hierarchical format. The information type definition describes a semantic structure for each information type that includes specification of (i) anchor points which are the origination points for links, allowing data elements to be accessed from multiple addresses but without replicating the underlying data; (ii) links which connect anchor points to other data addresses or ranges of addresses; and (iii) one or more independent anchor axes that allow pooling of anchors by defining a range of addresses using one or more dimensions on the other axes and projecting that information (without actually replicating it) to a different range of addresses.

The second axis in the multi-dimensional data array is the object axis, which may also assume a hierarchical tree structure with main and subordinate levels to any required degree of granularity, the tree structure being determined by the requirements of the specific use or industry. The object axis will typically define different products or product categories. For example, a bicycle manufacturer would enter bicycles, tricycles, or scooters as objects with the components, such as frame and wheels, as subordinate entries in a tree-structure.

The variant axis defines different versions of the products described on the object axis. This axis may also assume a tree structure with multiple levels defining variants and sub-variants as required. The language axis provides for structured management of multi-lingual versions of the information available from the matrix. It also facilitates the use of translation memory technology, as known in the art. The matrix structure gives added control to such computerized automation by ensuring consistent translation, avoidance of redundancy, and consistent formatting for automating final publication in different languages.

The following table shows a simple example of how information relating to the manufacture of bicycles could be structured using the matrix structure described by the invention"

| Object axis | Variant axis | Language axis |
| --- | --- | --- |
| Bicycle | Bicycle | Bicycle |
| Frame | Ladies' bicycle | German |
| Steering | Men's bicycle | English |
| Wheels | Children's bicycle | Japanese |
| Drive | | |

Control of the translation process is managed within the matrix. This control manages all phases of the translation process from the planning stage (estimation in advance of the effort to be required) to the assignment or translation responsibilities on through to the importing of the delivered translations into the database for use in publications. The translation process is described in detail below.

Control of the publication process occurs from the combination of the necessary information units for a publication on to the creation of the output files from which a paper layout, electronic publication (such as a CD), on-line (browser) view or data exchange is possible.

Layer Linking

Another key feature of the invention that enhances robustness and efficiency in the management of information is the concept of the layer link. The layer link is a mechanism for avoiding data redundancy, in that the data of one address range is projected into another. The definition of a layer link always occurs based on constructive (Object and Variant Layer Link) or linguistic (Infotype and Language Layer Link) specifications. Through this mechanism, in the simplest case a matrix address, that is, one cell in the database, can be projected to another. The most complex case permits the projection of a complete multi-dimensional address range. The projection relates only to the matrix addresses and not to the actual information units, which never require actual replication which could lead to later inconsistencies. In the invention's matrix, matrix addresses (cells) that are projected through a layer link are identified with a symbol.

Figure 2:
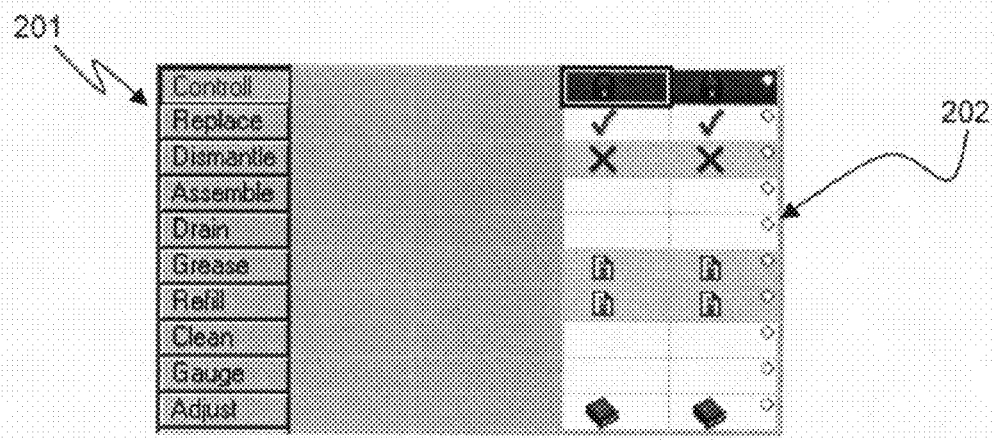
FIG. 2 depicts a tabular presentation of data that includes layer links flagged with a small circle.

FIG. 2 shows a tabular presentation of data 201 that includes layer links flagged with a small circle symbol 202.

Through the layer link, the same information units are available in the address range of the data projection [nnn] with the same attribute and status as in the data source [nnn]. This rule also applies for empty matrix addresses. If the data has changed in the address range of the data source, the change is transferred automatically to the address range of the linked data projection.

With a projected information unit, the SGML data of the data source is used and the address data of the SGML links is adjusted according to the projection rules of the layer link or the sequence of the layer link. By contrast, during the publication of a projected information unit, the path name for a linked file, such as an image file or multi-media file, is taken over from the source. An example of an SGML link may appear as follows:

Variant Layer Link from Variant 2 to Variant 1

Data Source: <LINK-IMAGE LINK="Picture\Frame\VARIANTE1\ENG#0123

Layer Link Projection: <LINK-IMAGE LINK="Picture\Frame\VARIANTE2\ENG#0123

An example of an file link (in this case to an image file) may appear as follows:

Variant Layer Link from Variant 2 to Variant 1

Data Source

: <IMAGE FILENAME="\\Server\GRIPS\Picture\Frame\VARIANTE1\ENG\xy.tif">

Layer Link Projection:

<IMAGE FILENAME="\\Server\GRIPS\Picture\Frame\VARIANTE1\ENG\xy.tif">

Several classes of layer links address real-world information management dilemmas. The sequence layer link projects constructive or linguistic dependencies. Here it is typical that sequences arise from sequential layer links (e.g. variant 3 of a product is the further development of variant 2 of the same product line. This is, in turn, a further development of variant 1). This sequence is interrupted for individual information units if the editor documents constructive differences. The Editor thus dissolves the layer link for the affected matrix addresses and manually describes the difference in this information unit.

The comfort layer link projects universal or "comprehensively-valid" information units (for example lubricants, tool lists or physical units of measurement) from a leading matrix address into different address ranges. Necessary editorial changes occur exclusively in the leading information unit. Therefore, this type of layer link is not dissolved by the editor. This is ensured through correspondingly-granted address rights in the inventions matrix as described above.

Using the layer link mechanism, the editor can set all SGML links within an address context (such as a variant). Thus the content of the publication of an object is generated completely from a variant.

An exception is required for variant-spanning objects. For the convenience of the editor, who must use a two dimensional computer screen in the course of editorial work, navigate is possible only in two dimensions—generally on the Infotype and Object Axes. Navigation on the variant axis is also rendered unnecessary when setting an SGML link for a comprehensively-valid information unit. If the Editor takes over an SGML link from another variant or language, they are made aware of this by a notice message, requiring the user to take manual control of the link.

The break-layer link projects its own address range onto itself. This means that the layer link origin and layer link projection are in the same address range. With this mechanism it is possible to invalidate a superior layer link projection in an address range. Therefore, the definition of a break-layer link is only possible if a superior layer link exists.

A layer link is defined in the invention's matrix confirmation of a matrix address as a layer link origin and a second as layer link as a projection. Thereby the addresses of origin and projection can differ only by one dimension. The projection occurs for each layer link precisely in one dimension of the matrix. Thus there arise four different types of layer links: (1) Infotype layer link; (2) Object layer link; (3) Variant layer link; and (4) Language layer link.

Starting from the matrix address of the layer link projection, the definition of the layer link rule can be passed along to the hierarchically-subordinate elements of the matrix address. Through the transmission, the layer link affects a multidimensional address range. If the transmission is activated for an axis, there is a linear projection; with two axes, there is a planar projection and with three axes, a cubic projection.

Figure 3:
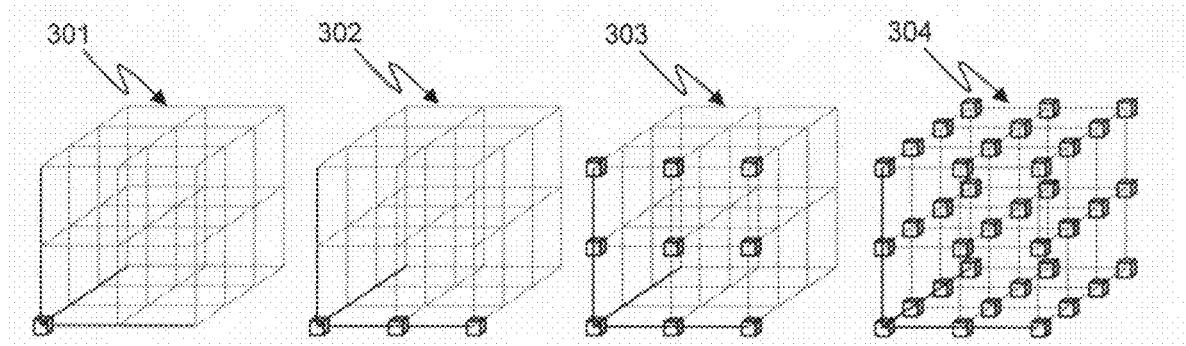
FIG. 3 depicts transmission behavior on information models with different numbers of axes.

FIG. 3 depicts transmission behavior from left to right (without transmission 301, transmission on one axis 302, two axes 303, and three axes 304).

If the transmission is selected for the same axis on which the layer link acts (e.g. transmission on the variant axis for variant layer link), the same origin is projected in all hierarchically-subordinate elements.

Figure 4:
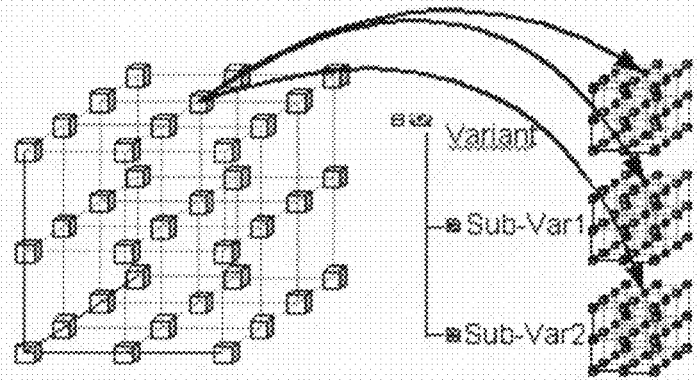
FIG. 4 depicts the projection of a link onto the same axis.

FIG. 4 depicts the projection of a link onto the same axis. In order to achieve sensible effects with these transmission mechanisms, it is important that in the selection of the layer link origin and the layer link projection, the correct entry is selected for all four axes.

With the infotype layer link, the address range of an infotype is projected onto another. This means that two infotypes have the same information. However, this application is very rare. Infotype layer links are always set as language-spanning since the projection rule "two pieces of information are the same" applies for all languages. With an infotype layer link, the ITDs of the linked infotypes must be identical. If an information unit is opened from the projected database, the ITD agreed upon for the infotype is opened and filled with the content of the data source.

With the object layer link, the address range becomes an object axis section (e.g. of a component) projected onto another one. This type of layer link reflects the construction principle of the use of equal parts. This means: A component is built into the product in several locations. The reason for defining an object link layer is provided by the construction. Thus the constructive dependency of different objects is transmitted in the editorial process. Object layer links are always set language-spanning since the construction principle "use same components in a product" applies across languages.

Figure 5:
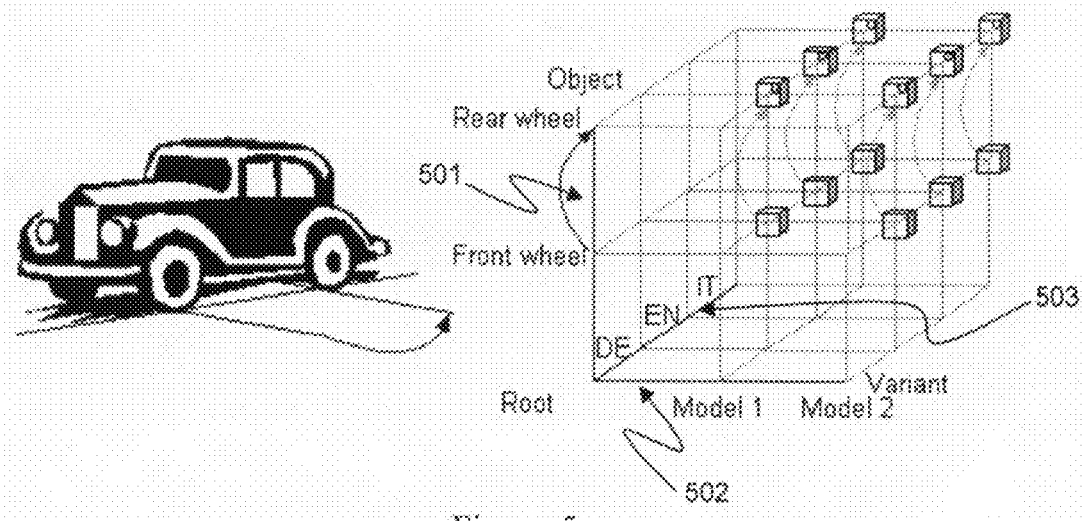
FIG. 5 depicts a schematic example of an object layer link.

FIG. 5 provides a schematic example of an object layer link. All information units of the object "front wheel" are projected to "back wheel." The layer link is defined in the for Infotype 501, Variant 502, and Language children 503.

For the projection of standard components, the object structure of the standard component must be a component of the structure of the product since each structure node of the standard component is projected by an individual object layer link onto the corresponding structure nodes of the product.

With the variant layer link, the address range of a variant (such as a product series) is projected onto another one. This type of layer link reflects the construction principle of further development. This means, a variant is the basis for a further development. The reason for defining a variant link layer is provided by the construction. Thus the constructive dependency of different variants is also transmitted in the editorial process. Variant layer links are always set as language spanning since the construction principle of "further development based on a predecessor" applies across languages.

Figure 6:
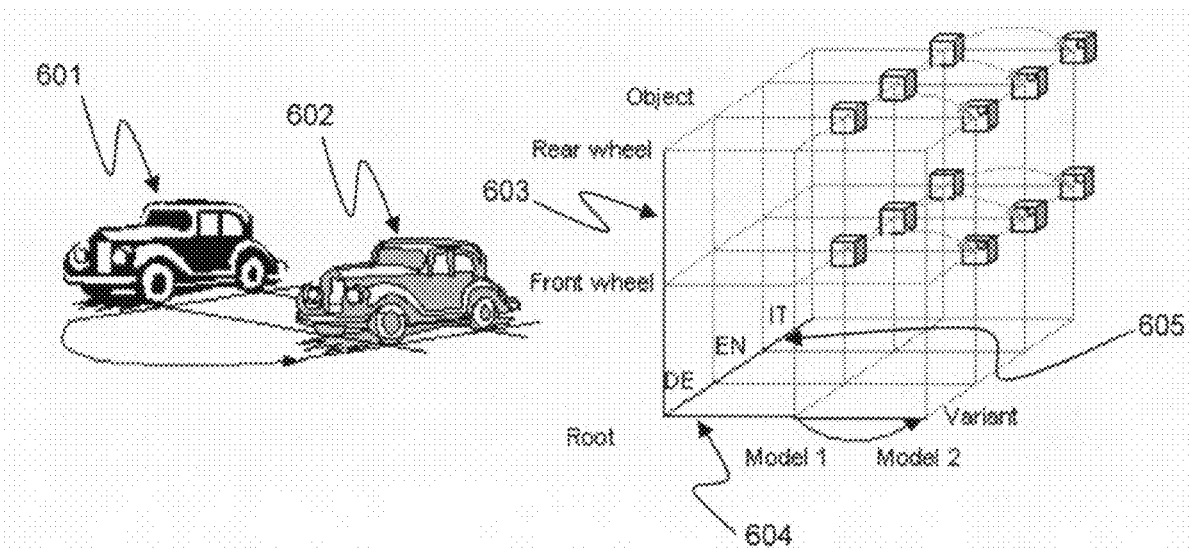
FIG. 6 depicts a schematic example of a variant layer link.

FIG. 6 schematically depicts a variant layer link. All information units of the variant "model 1" 601 are projected onto "model 2" 602—in this case a new model of an automobile that uses certain defined components that are carried forward from the earlier variant the latter. The layer link is defined in the for Infotype 603, Variant 604, and Language children 605.

With the language layer link, the address range of a language (e.g. the editorial language) is projected onto another one. This type of layer link is only used for infotypes that have language-neutral or language-spanning valid content. Address ranges that are linked through a language layer link are not translated. Language layer links should be defined before the first editorial processing. In any case they must be set before the first translation order since they are managed in the history. This means that if the translation of an information unit occurs before the definition of the language layer link, the information unit is output for translation and managed accordingly in the history in the target languages rather than through the link.

The language layer link provides redundancy control and limits translation effort and cost in cases where (1) the information is language-neutral, e.g. images without text; (2) the information is language-spanning, e.g. UK English and US English; (3) the information type contains only address variables; or (4) the information type contains only SGML links, e.g. there is in the infotype MAINTENANCEWORK only the combination of LINK-INTERVAL and LINK-WORK.

Figure 7:
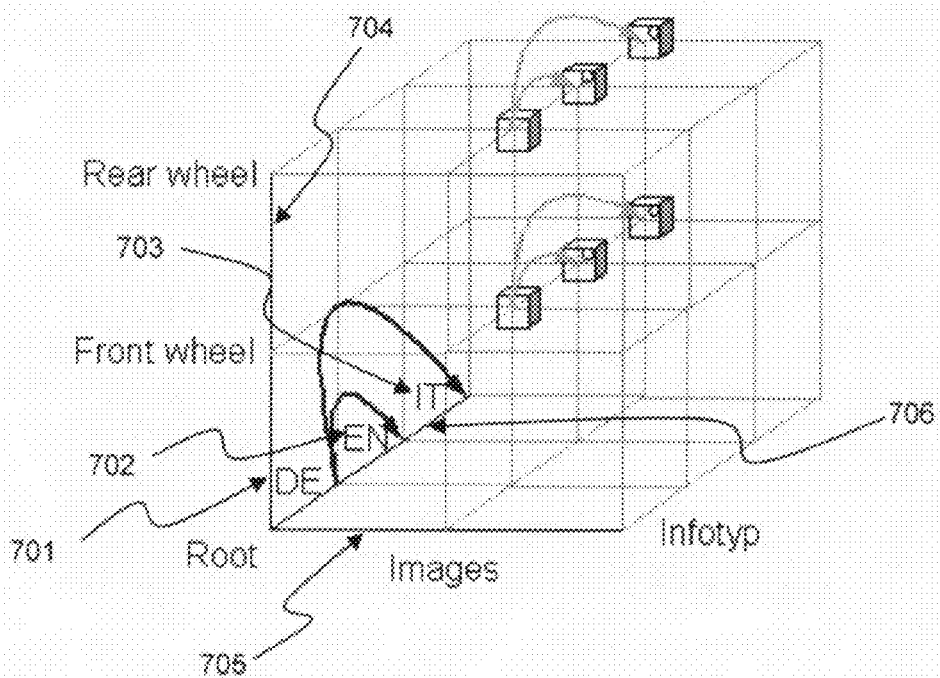
FIG. 7 depicts a language link structure in which language neutral material is projected onto the language layers along the language axis.

FIG. 7 depicts a language link structure in which language neutral material (images) are collected in the German language edits designated as DE 701, and projected onto the English 702 and Italian 703 layers along the language axis. The layer link is defined in the address for Object 704, Variant 705, and Language 706 children.

The source layer for each layer link can be identified as an anchor and given a descriptive name to further enhance and simplify management of the information. Users select as anchor name a term or an abbreviation that summarizes or codes the content described. Anchor names must only be unique within an information unit. The repetition of identical anchor names in other information units is permitted and recommended since this supports the mechanism of the layer link and facilitates consistency. A new anchor name must be defined if new content is described. In case of a correction or completion of the content, the anchor name remains unchanged.

Figure 8:
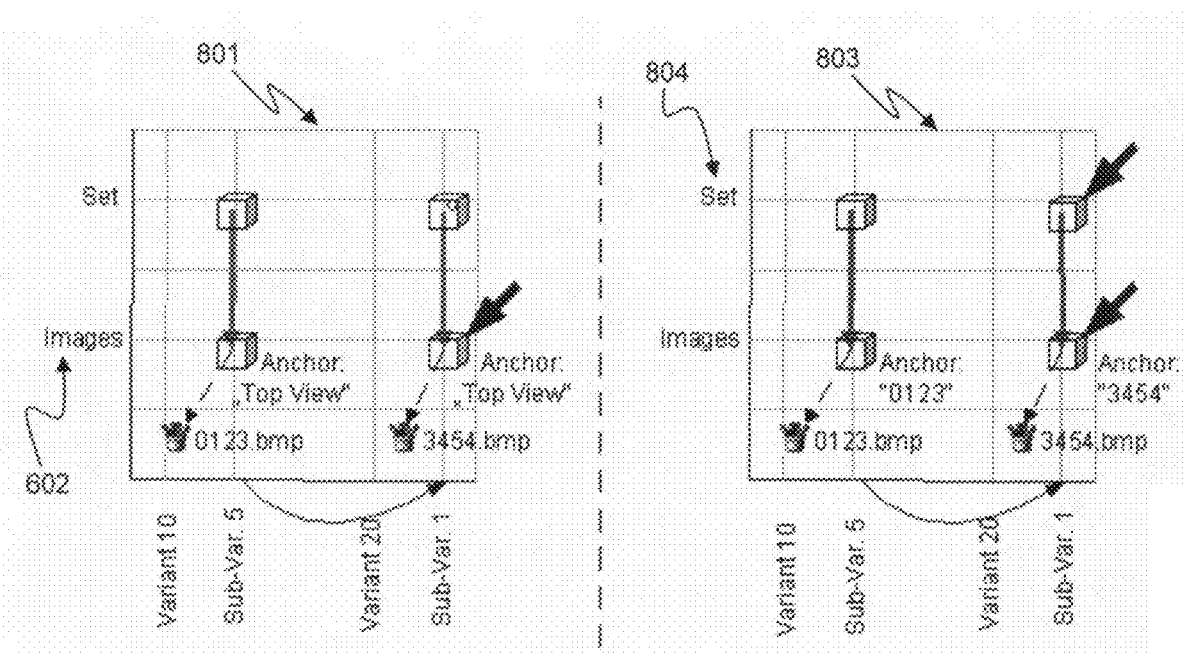
FIG. 8 depicts a cessation process linked from one sub-variant to another.

FIG. 8 describes an example in which the sub-variant 5 of the variant 10, a cessation process, is described. This cessation process is completed with a figure linked by an SGML link. Via a variant layer link, this information unit is projected into the sub-variant 1 of the variant 20. The procedure for the cessation process is identical; only the image must be exchanged since the geometry is different. In the example 801 on the left, only the information unit "Images" 802 is changed—in the example 803 on the right, the link in the information unit "Set" 804 must also be adjusted.

Comprehensively-valid topics are managed by the invention in an individual partial cube in the same project. This means, they have an individual axis section on the object and variant axis. In order to be able to bring the data of these objects into the respective variant of the actual product-specific documentation, they are projected via object and variant layer links into the other axis section. This provides a distinct advantage in that editorial documentation of further development of standard objects can occur independent of the further development of the projects.

For example there may be standard supplies or equipment (e.g. lubricants and tools) that are used across variants. This equipment is documented centrally and projected with the help of a comfort layer link onto all variants. In this case, write rights must be granted to the central location. In the projections, only read rights are granted.

Figure 9:
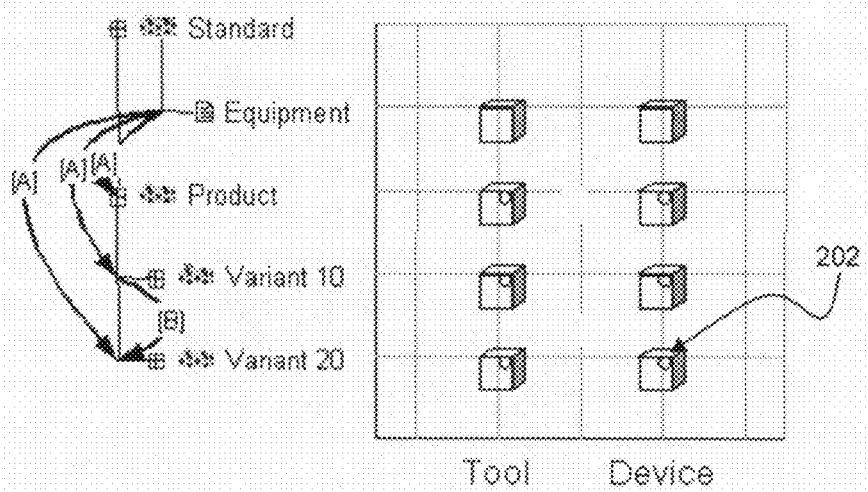
FIG. 9 depicts the use of links to project standard equipment usage from a standards information unit to a product and its variants.

FIG. 9 depicts the use of links to project standard equipment usage from a standards information unit to a product and its variants. The circle symbol 202 indicates linked data.

Figure 10:
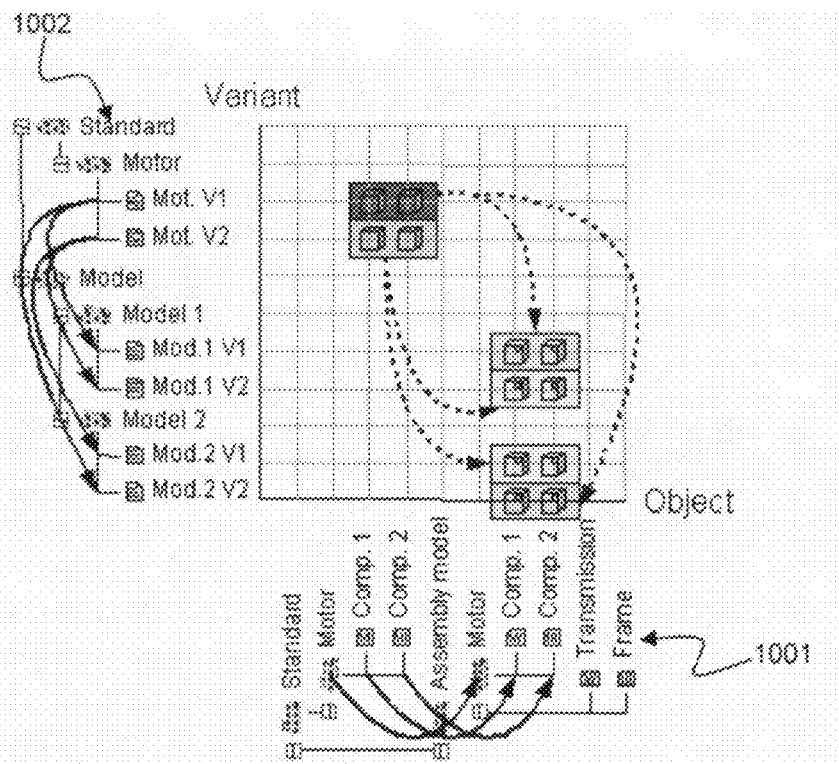
FIG. 10 depicts the projection of standard product components that are used across product variants.

FIG. 10 depicts the projection of standard components 1001 or aggregates that are used across variants 1002. They are documented on individual axis sections (both the object and variant axis).

The actual use of a standard component in a variant of the product then occurs through the projection of the data with the help of object and variant layer links. The corresponding partial structures of the object axis must be identical in the standard component and the product. By integrating the standard component into the product it is possible to insert the standard component automatically in the correct position in the hierarchy. In this case, write rights are only granted for the standard components. In the projections, only read rights are granted.

Many technical products have a specific mechanical layout and specific control software. The further development of software and mechanical layout is mutually dependent, but the individual development stages generally are not synchronized. In the invention the software is described on an axis section (object and variant axis) and the mechanical layout on another section of the same axes (object and variant axis). With the help of variant layer links, the corresponding software status is projected onto the associated mechanical state of construction. This means that in a mechanical state of construction, a software version is read in clearly. In this case, write rights are only granted to the nodes software objects/software variants or mechanical layout objects/mechanical layout variants. In the projections, only read rights are granted.

Figure 11:
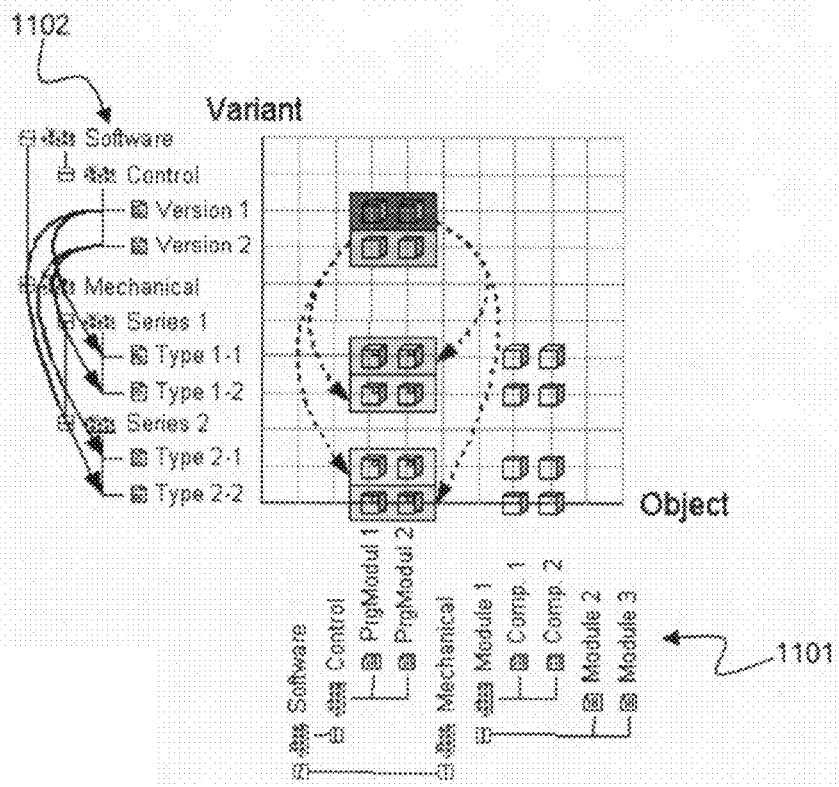
FIG. 11 depicts the use of layer links for assignment of a program state to a mechanical state of construction.

FIG. 11 depicts the assignment of a program state 1101 to a mechanical state 1102 of construction.

If there are several layer links simultaneously in an address range of the invention's matrix, then the individual layer links are inserted one after another according to the principle of vector calculation as is known in the art. This means that the origin of the first layer link points to the projection of the second layer link, which is then followed. Starting from the current matrix address, the next layer link in the address range is always followed first. In another address layer of the matrix, several layer links may be placed in the same dimension, e.g. several variant layer links. The layer link is effective that is in closest proximity to the current matrix address.

Figure 12:
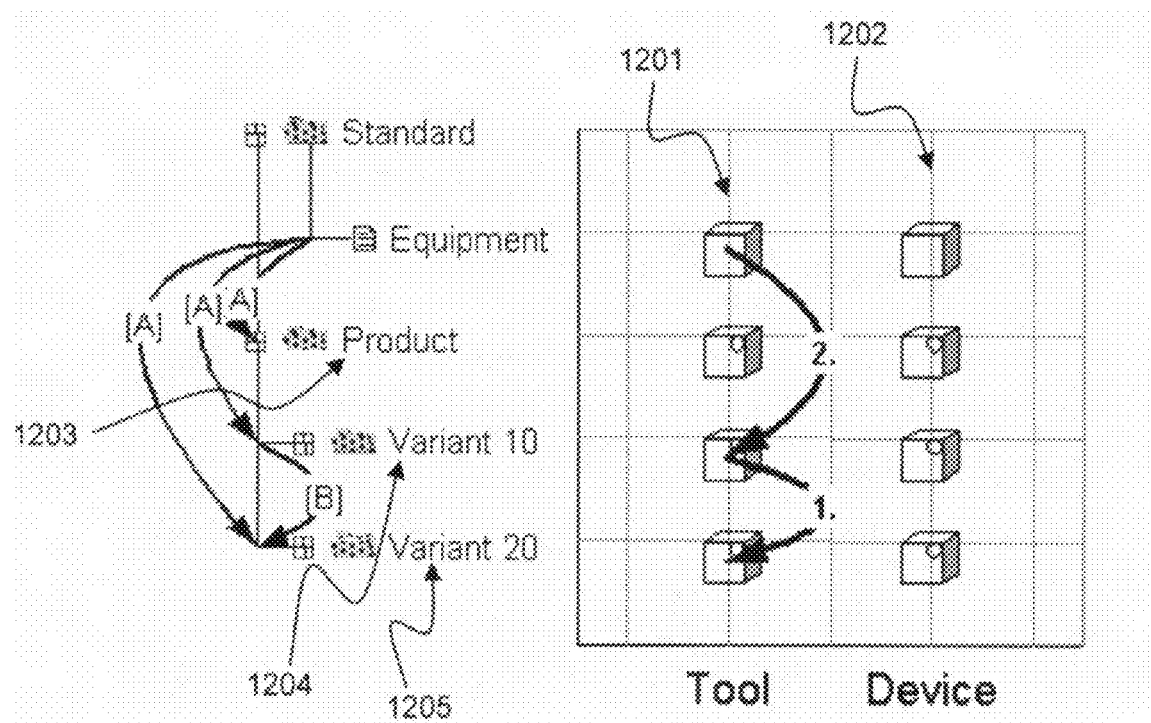
FIG. 12 depicts serial layer links ordered in accordance with vector calculations.

An example is depicted in FIG. 12 where the infotype "Tool" 1201 is passed along with a comfort layer link from the object node "Device" 1202 and the variant "product" 1203 across all products and their variants. At the same time, there exists for all infotypes and all product nodes on the object axis a layer link that passes along the variant 10 1204 to the variant 20 1205 with a variant layer link. When opening the matrix address "tool/product/variant 20/de," the data is retrieved from the "variant 10." Since the "variant 10" in turn is only a layer link projection, the layer link of variant 10 is now followed to the equipment that projects the data from the product.

Consistency in following layer links is ensured by priority rules. The following priority rule applies:

(1) Language Layer Link

A language layer link is followed for the current address with the highest priority. If the content of facts changes, the translation must be adjusted in order to describe the same content in another language.

(2) Infotype Layer Link

An infotype layer link is followed for the current address with the second-highest priority. If there is redundant information, the original must be used.

(3) Object Layer Link

An object layer link is followed with the third-highest priority. From a constructive point of view, the same parts are normally changed out in the entire product in case of further development. It is unlikely that the component of the predecessor is used in the product, although otherwise the reworked component was installed.

(4) Variant Layer Link

A variant layer link is followed with the lowest priority.

Figure 13:
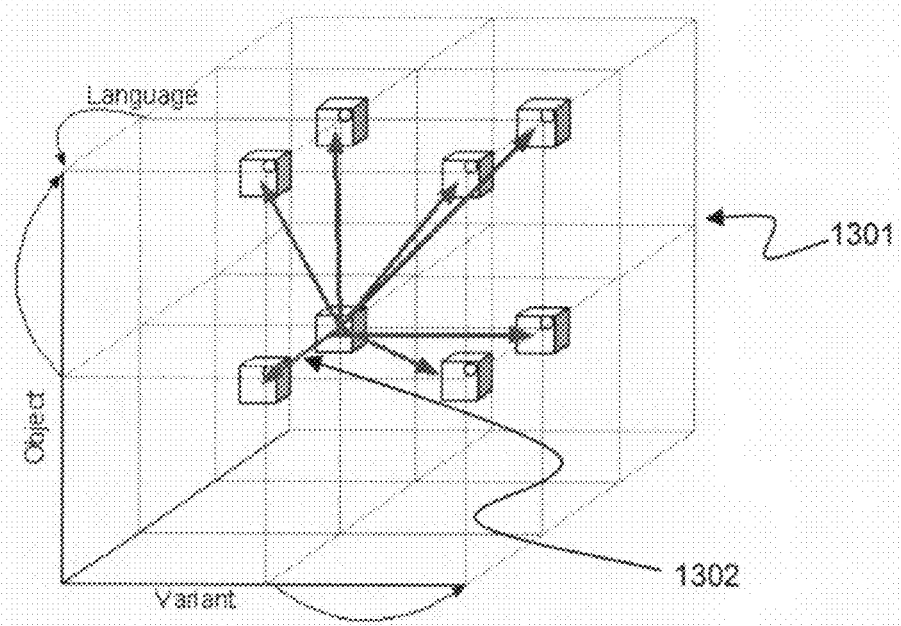
FIG. 13 depicts how layer links are followed according to vector calculation.

FIG. 13 depicts how layer links are followed according to vector calculation. Vector proximity is computed using methods known in the art to determine the relative distances between points in a multidimensional array 1301. The link having the closest proximity, represented by the shortest vector 1302, is readily computed using vector computations.

A refinement of the layer link concept, known as pooling, further augments the flexibility of the invention and further eliminates redundancy. The basic layer-link concept comprises a list of layers that provides links to where the most recent data was stored. Independent but similar information would, with this approach, often be stored in a common address. While these independent data elements are not linked, they are related by sharing a common location. If these independent data elements consisted of a set of torque values for assembly or repair of a machine, for example, and a design change necessitated the change of only one, the full set would require editing.

Under the pooling enhancement, an additional axis is added to the existing four axes as described above. This new axis, an ID axis, allows the management of several independent units within a single matrix address. Data can be added as well as changed on the new axis without rewriting the other elements. In essence, the new axis adds a transparent data layer on top of others. Data that remains unchanged is still visible and accessible as before. Only added or changed data is affected by entries using this axis, avoiding the need to verify, edit, or re-translate any but the new or changed data.

Pooling is not beneficial for all information types. Thus, when an information type definition is created, describing the data categories required to populate that information type, it will be apparent whether that infotype can have multiple entries (such as the group of torque values in the above example). Pool anchors are created at the same time as the information type, allowing the pooling concept to be invoked for an information type which requires individual management of each data element.

Figure 14:
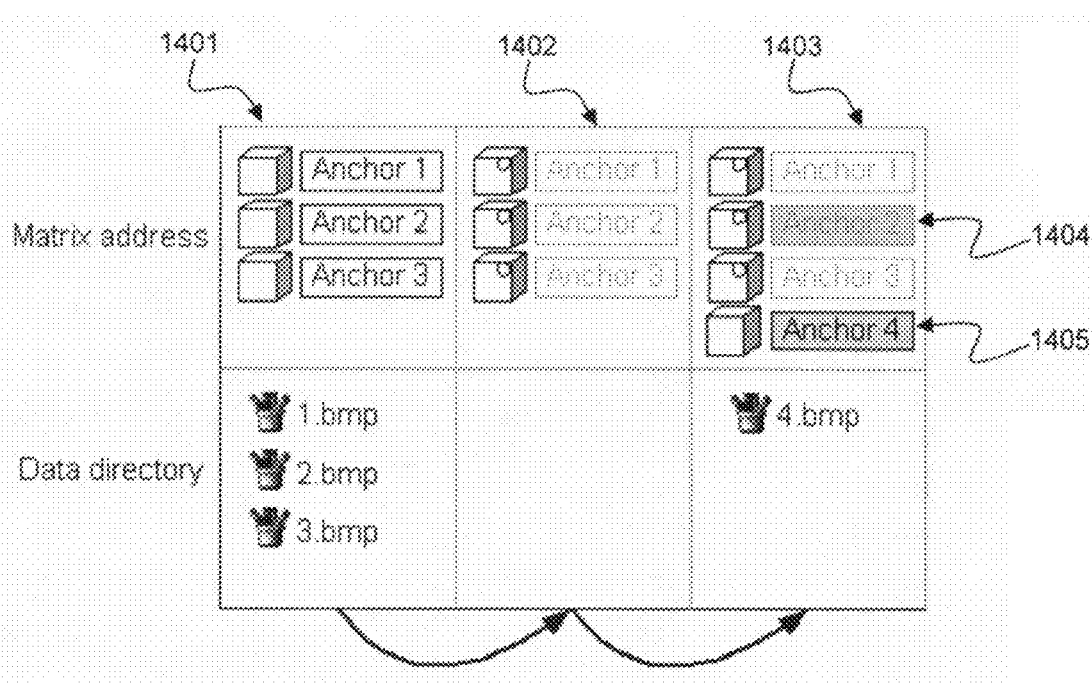
FIG. 14 depicts the use of the pooling concept.

FIG. 14 depicts the use of the pooling concept visually. In the first projection, a specific matrix address 1401 has three anchors, numbered one to three. This matrix address is projected via layer-link on two other matrix addresses 1402 & 1403. Within the second projection, the second anchor 1404 is no longer required, but a new element, anchor four 1405, is being added. The left image 1402 depicts the conventional solution in which the layer-link for this matrix address is dismissed, the anchor 2 is eliminated and the anchor 4 is added. The anchor 1 and 3 are redundant within this solution.

The right image 1403 depicts the pool-concept solution in which anchor 2 was eliminated in the projection, while anchor 4 was been added within the projection. As a result, the anchor 1 and 3 are further projected and are not redundant.

Managing and Editing Information in the Model

The matrix manages queries relating to administrative information facilitating robust management of the entire information management process. A management may set up pre-determined queries to obtain information about the processing status of individual information units or the list of information units required for a particular publication. A query may also be used to compare content differences between two editing statuses of an information unit. It is also possible to query the relationships in the database in the form of a cross-reference and to obtain a listing of the references that relate to an information unit providing a dynamic view of information relationships.

The native editor provided with the invention is based on the SGML standard, as known in the art. This facilitates editing of the information units independent of the final layout. Thus, the focus of the editor is limited to researching and collecting the content.

The editor provides for dynamic display of the SGML structure. An information type definition (ITD) (hierarchy, sequence, and frequency of the SGML elements) for the edited information type is displayed for the editor and the meaning of the individual elements is explained.

The editor's primary function is to display of the content being edited. During the editing process, the user can insert the SGML elements into the document and populate them with content. The insertion of the SGML elements is controlled so that each time there is a valid SGML document for the pre-determined document type definition. To optimize the data input and display functionality, the display of the SGML elements can be configured user-specifically.

The editor also presents the SGML link. The invention's editor can create SGML links between two information units and follow existing links. In addition, the editor can query a cross-reference from each reference target (known as the "anchor") and from this see in what context the information unit is used.

The functions implemented in the invention's native editor provide significant increases in user productivity. The SGML editor has a consultation window in which the user sees suggested context-specific sentences from the existing database during creation of new entries. The user is also informed dynamically about adherence to uniform terminology. The editor automates a significant degree of quality assurance by dynamically checking the orthography during data entry and marking unfamiliar words for manual verification by the user. When the editor completes the editing of an information unit, the created contents are checked for data integrity. The invention's editor flags empty SGML links and those that do not conform to the pre-determined template for the specific type of information unit.

The invention's editorial system can be divided into two categories with respect to the smallest data unit managed: (1) systems that manage formatted documents—document management; and (2) systems that manage content-based information—information management.

A document is a concrete combination of information that was created in its present format for use by people. This self-contained unit can only be evaluated in more detail with respect to its content by a person. For this, particular components of the document such as headers are emphasized visually through formatting. From formatting alone, however, a computer cannot determine whether the content describes a task or a component designation. The actual content of a document cannot be evaluated by a computer. At the same time it is clear that in a document the following components are connected inseparably with one another and can only be reused in their respective present form:

(1) Content—the message to be communicated.

(2) Structure—the sequence and hierarchical relationship of the information units among each other.

(3) Format—the form of the content visible to people.

Thus, documents must be managed if the content in this form is important, such as for the clarification of different responsibilities.

The invention's architecture is a database-based, modularly-constructed software system with configurable standard components for the handling of typical editorial processes, with standardized interfaces to software systems that support the editorial process and with configurable interfaces to other software systems that are standard tools in the electronic data processing field.

The created documentation generally includes both text and graphic information. With increasing electronic publication, so-called multimedia information carriers may be added as information units, such as animations or video sequences. Multimedia information carriers characterize themselves through their transmission of at least two media simultaneously (e.g. sound and image), whereby one of the two media must be dynamic—that is, subject to change over time.

With the invention, users can manage numerous graphic and multimedia formats and link them with the primary data. Depending on the selected publication algorithm, the user can determine which of the linked media will be used in which application case. For example, an assembly instruction for a piece of equipment may be presented in a series of still images in a paper-based publication, while the same instruction may be presented as an animated sequence or live video presentation via the Internet.

Technical documentation generally consists of documentation from the equipment manufacturer and a set of third-party documentation that was created by external manufacturers of components. The invention allows the user to manage these third-party documents as independent documents and link them with the database.

The invention provides forms configured to match particular SGML/XML structures that can be optionally integrated into the invention. They permit a simplified, form-based input of SGML/XML content. In addition, the quality assurance of the data in these editors can be increased to significantly improve on the normal SGML/XML standard, because data of the individual structure elements can be checked even more precisely, including, for example, verification of the number of characters, data type, forbidden characters, or content depending on other elements).

The invention provides a viewer that services as the publication engine for the generation of the paper layout of SGML/XML documents. When creating the paper layout, text and images are placed on the proper. When creating the paper layout, the viewer checks whether all images defined in SGML/XML are actually available. Missing images are indicated by a gray box in the layout.

When generating the paper layout, the viewer requires the fonts defined in the layout instructions (True Type or Postscript). If the fonts are not installed in the computer environment on which the viewer is being used, the viewer informs the user about missing fonts and about individual missing characters in a font type. The text is nevertheless displayed in a substitute font so that the content can be checked. Thus, fonts used in final publication, that may be subject to limited licenses and additional costs do not have to be installed on each computer system, but only on those actually used to generate the publication-ready copy.

The viewer functionality also allows the user to jump back to the data source.

If editors discover content errors in the created layout, they can mark the text sequence in question and the viewer will ensure that the associated information unit is opened for further editorial management. This same functionality is available in order to open the displayed graphics file, provided that the software required to edit the graphic (such as Adobe Illustrator for EPS format files) is installed on that editor's computer system.

The editor intentionally does not provide for changes to be made in the layout or of the displayed content directly in viewer. This ensures that all information—including corrections and final edits—are changed only in the data source, and that the layout is essentially created fully-automatically and thus uniformly and consistent with the organization's standardized design. In addition, this procedure demonstrates that the information is collected independent of its specific presentation and thus a media-specific different presentation of the content can be undertaken without risk of presenting inaccurate information.

The invention's manager is the tool for configuring and administering the overall functionality of the software. The manager provides a number of important functions including management of the overall data structure, status states, and user rights. It allows full configuration of the management model. This includes creation of the four-dimensional management structure. The navigation axes are created and changed in the matrix using the manager. The manager also provides for configuration of the status model. This includes creation of the necessary editing states for control of the editing process, as described above. Configuration of the user model includes the creation and designation of the users, user groups, and their basic rights required in the invention.

The manager also provides for monitoring of the database. This includes checking of the information units, whether their information structure is valid with respect to the document type definition and whether the content links are correct, and checking of the documents required in the database. The manager will also compare information units in different locations if the content is collected from multiple sources or input by multiple data enterers to ensure consistency. This comparison can be done manually or periodically by an automated service that delivers a report to pre-determined users.

The underlying hardware and software requirements are based on standards known in the art and in common usage in industry, business, education and government. The invention is client-server software with central, database-based data storage. All applications and data is managed and administered on the server. This reduces the effort required for system support. Installations and updates are only carried out on the server and all clients work with the same software version.

The performance of the system on relatively modest computer hardware is guaranteed buy the slim, integrated architecture. Thus experientially-determined medium requirements are made of the computer equipment and the network connection.

The requirements of the EDP infrastructure depend in the end on the documents to be published. For the publication of extensive, complex documents (greater than 1000 pages) that contain storage-intensive graphics and multimedia components, additional memory is required. In addition, the requirements of the network transmission rate also become more demanding.

A relational database is used for the management of data, structures, and publication definitions. Supported relational databases include Microsoft SQL-Server 7.0+SP, Microsoft SQL-Server 2000+SP, and Oracle 9.1i.

Information Modeling

The invention constitutes a robust environment in which the user can model the system's behavior to industry-specific requirements. Modeling is the application-specific configuration of the degree of freedom of the invention according to the requirements of the product's information to be managed. During this preparation, the user generates the matrix by defining an information model, product model, language model, approval model, status model, and publication model.

In the information model, the topics to be managed and their degree of detail are specified. The goal of the information model is the definition of context-free, reusable information units. In addition to this decisive advantage, a uniform level of documentation can also be achieved, which for the understanding of circumstances requires a necessary minimum quantity of information from the author. This guarantees even with information collection based on a division of labor that there is a uniform style in the database.

The information model is a hierarchical model that describes the dependencies of the existing information types on one another. Each information type is a self-contained content, structured response pattern targeted to address a typical knowledge requirement that a user of the documented product may encounter. The actual components of an info-type, which the editor must research to populate the data, are identified by analyzing existing documents or by conducting a situation analysis with representatives of the target user group. The list of defined information types forms a hierarchical dimension in the invention Matrix.

The content structure of the information type is the Information Type Definition (ITD) which is a derive of Document Type Definition (DTD). The ITD describes, by using semantic element names, the structure of the content of the information type. The difference between ITD and DTD is that in the ITD each element gives evidence about its content and not about its representation. Figure [xx] shows on the left side an example of an ITD for a task description and on the right side an DTD for the same kind of information. With elements like <step> and <instruction> the type of content is clearly defined. An element name like <para> defines the representation but not the type of content.

The structuring principal of the innovation is that in the ITD only semantic elements could contain non-semantic elements; non-semantic elements could not contain semantic elements. Non-semantic elements are only allowed if the type of content could not be specified in more detail. For example the <instruction> could contain multiple paragraphs.

Also the ITD provides the opportunity to link to other information types in particular places, such as the link to a tool in a work description. The hierarchy of the information model arises through these link opportunities. The hierarchically-superior information type is made more precise by information of the subordinate one. The hierarchy mirrors how the information is created. Information on lower levels are created sooner than the ones on higher levels. For example technical data exist before a task is written which uses the technical data.

This type of link can be traced logically at any time and is therefore significantly more transparent than the link between two text passages due to their accidentally-similar formulation. The defined structure and the content-related distinction of the information components in an information type bring intelligence into the database that enables an automatic further processing (e.g. publication) and an effective search.

The advantage of this principal is that the data, stored in such kind of structures, are maximum intelligent. So they could be completely interpreted by the computer from top to bottom. For example a list of tools needed for a task could be generated by selecting all the tools linked to a step. Or the question "What is the use of a specific tool" could be answered by selecting all task in which the tool is linked.

Figure 15:
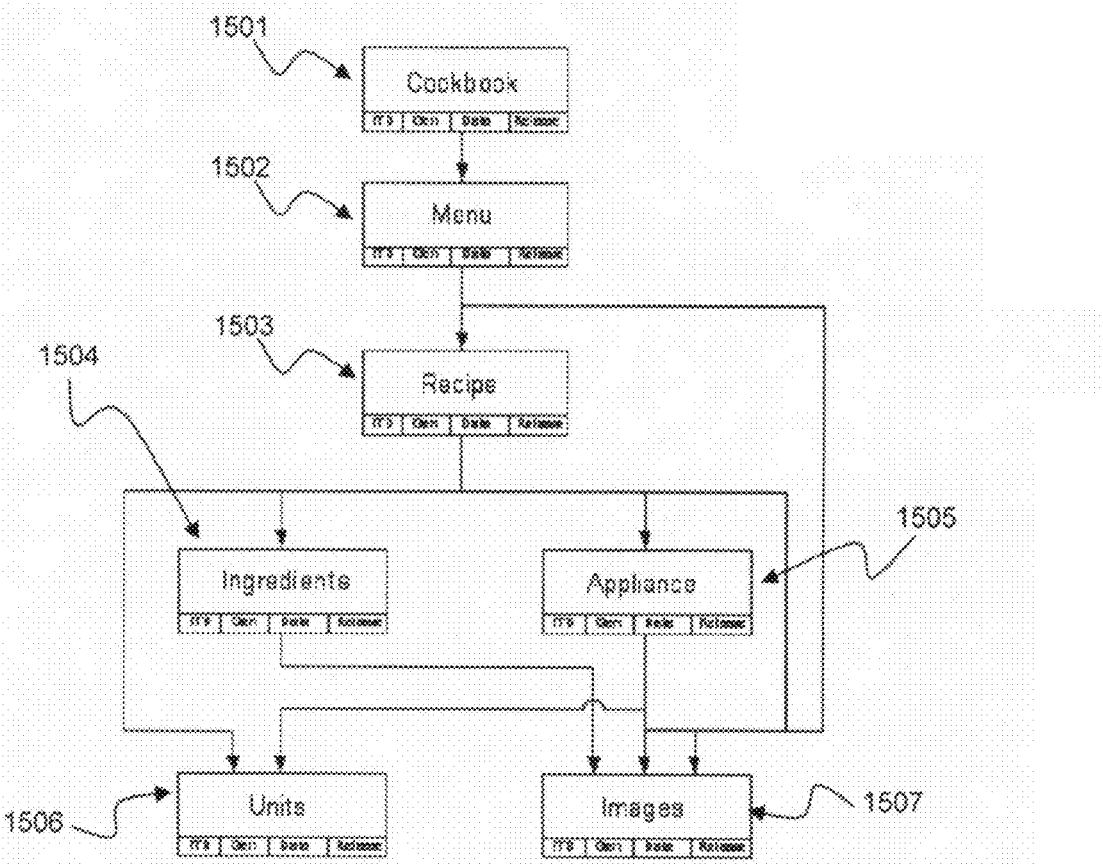
FIG. 15 depicts the information model for a hypothetical publication.

FIG. 15 depicts the information model for a hypothetical publication—a cookbook. In this depiction a hierarchical information structure identifies the entire cookbook 1501, complete menu selections 1502, and individual recipes 1503. The recipes, in turn, include a list of ingredients 1504 and equipment or utensils 1505 required to create the recipe. Units 1506 used to identify quantifies of ingredients are separately characterized providing the capability to convert units. Finally, graphic images 1507 may be linked to their descriptive counterparts.

The product model is a neutral multi-dimensional representation of the product to be documented. One dimension of the structure describes the hierarchical product structure (e.g. mechanically, technically, functionally or procedurally) and another dimension the product variant, in which the variant describes the variety and the occurrences of the product (e.g. product models, series, or versions). The analysis and definition of the product model assumes a detailed knowledge of the product.

The product model defines two additional hierarchical dimensions in the invention's matrix. In many products, constructive solutions are used repeatedly (e.g. an assembly exists several times in a product). This redundancy is also reflected in the product construction and, in the case of the product documentation, can lead to redundancy. In these cases, the invention enables the projection of information with the help of layer links in order to reduce the redundancy to the practical minimum. The layer link describes constructive similarities in the product model, which are documented in one place and available automatically in all other parts of the Matrix. If differences must be documented in detail in individual places (e.g. country variants), the user can resolve the layer link manually and enter the specific information.

The language model is a (hierarchical) representation of all languages and dialects to be documented. Thus the language model forms the fourth dimension in invention's matrix. As with the product model, the layer link can also be used here to project linguistic similarities, e.g. for language-independent representations or for dialects that have similarities that may be harvested to avoid unnecessary redundancy. A practical example would be the management the minor but important differences between US English and UK English.

The approval model defines for which combinations of information type, product construction, and product variant information units can be collected sensibly. For example, the list of maintenance work can only be collected for a module or for the entire product. By contrast, the specific torques required of certain assemblies can only be collected for an assembly and not with respect to the overall product.

The status model describes the various processing statuses that an information unit can assume. The goal of the status model is to be able to provide an information unit with a statement about the quality and the degree of maturity of its information.

The matrix is reflected the structure described above. The matrix is a multi-dimensional system that consists of an information model, the product model, the language model and the status model. This model is configured project-specifically in the invention's matrix structure. This model defines sensible storage locations for the individual information units. The goal of the matrix is to specify a common, clear, and uniform scheme for the storage of information. This ensures that a particular piece of information can only be stored sensibly in one place. Thus each user finds information even if they did not create or store it themselves.

The publication model specifies which of the collected information should be output in which form. It is significant that not all information must be published and not all information occurs in every occurrence of the publication. The invention facilities this type of information pruning by the creation of appropriate models. The goal of the publication model is to specify the various output formats and, simultaneously, to ensure a uniform appearance of the publications created (e.g. compliance with corporate design).

The publication model is the basis for the multistage publication process. It includes the definition of a conversion instruction (e.g. DSSSL syntax) and the associated layout specification (the style). The conversion instruction creates the data for the document to be published from the information components of the information units sent for publication. Here, among others, the following steps are carried out: (1) Filtering of the information (e.g. according to target group) from the total database of the information units required for the publication; (2) putting the filtered information into the sequence for publication; (3) collecting information in the document for an index; (4) converting physical measurement units into other measurement systems; and (5) definition of the navigation structures for electronic publications.

In the end, the layout specifications contain the layout components and formatting instructions that produce an appropriate display for the output medium whether physical or electronic. This includes, among other things, font specification and paragraph formats, and grouping rules for paragraphs and image-text units. The result of the publication process is a document generated completely automatically, which based on the content networking can be much more complex than the structures of the comparatively-simple individual information units A defined publication model is universally valid so that the publication of the documents in all languages occurs without manual DTP work and each publication of a publication type has the same structure (corporate design).

Based on the separation of content and layout and the consistent implementation of the SGML/XML technology, for example the following media can be created from the information units collected with the invention: (1) paper documents; (2) browser readable publication in XML/XSL or HTML format; (3) CD applications with capable of running independently and with all content formatting and multimedia accessible; (4) file export in any text format (e.g. csv file) and any character set (e.g. ASCII or Unicode); (5) publishing into a database.

Figure 16:
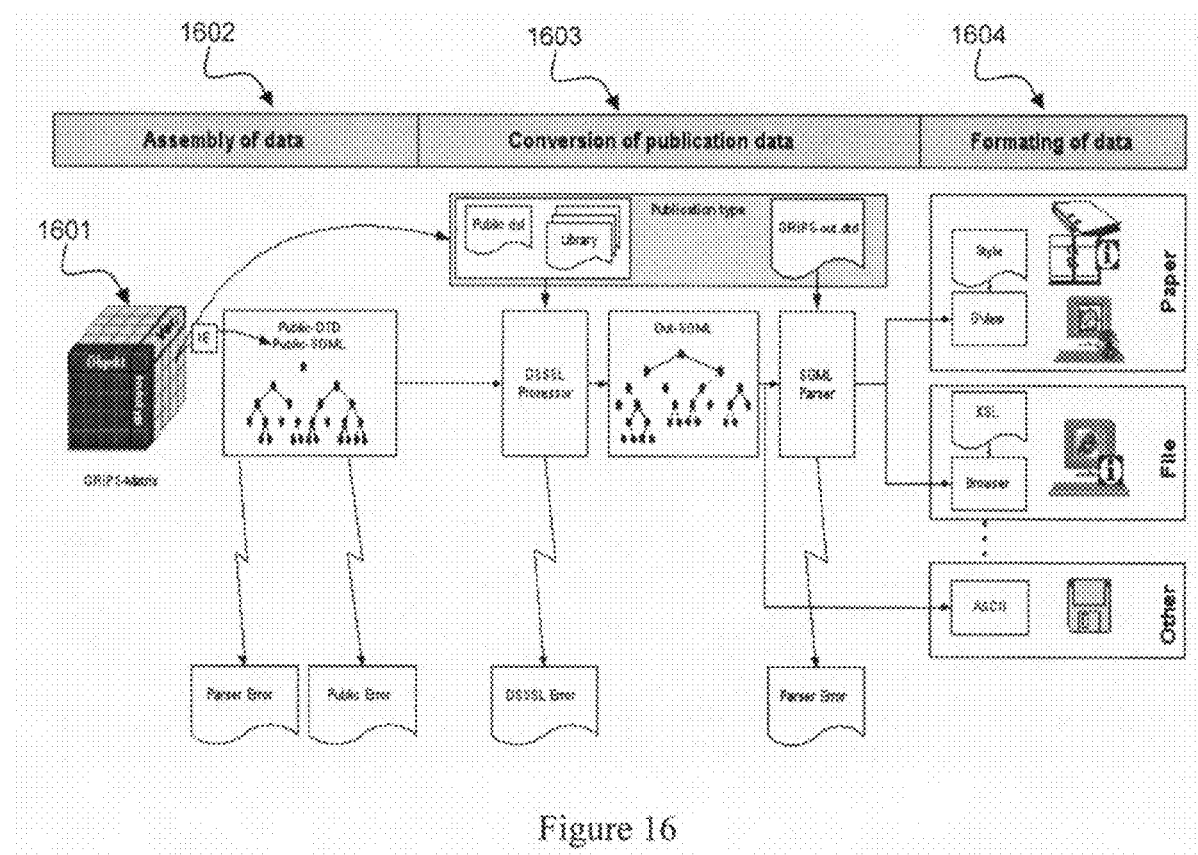
FIG. 16 schematically assembly, conversion, and publication of data from the matrix.

FIG. 16 schematically depicts the assembly 1602 of data from the matrix 1601, conversion 1603 of publication data into the pre-determined output structure, and formatting 1604 for final document publication on paper, via the Internet, or by other means.

The status model describes the various processing states and thus the degree of maturity of an information unit within the editorial process. Each status describes a defined quality level of an information unit. Therefore, the status model is defined using the existing editorial process. To control the editing process, user rights can be defined depending on the status. Thus it is possible for particular user groups to be able to edit the content of information units only at a particular point in time.

For example, if an editor has completed research and set the processing status to "check linguistically" this indicates that the editing of the information unit is self-contained with respect to content but should be read again by a proof-reader or other designated lexical reviewer. At this moment, the editor automatically has no further write rights to this information unit as long as the information unit is under lexical review. This functions as a "data lock" as is known in the art and is implemented via the functionalities inherent in the underlying database technology.

Via the user model, the responsibilities with respect to the content of the information units are specified clearly. For this, the permitted user groups and users for a specific installation of the invention are created. In addition, the rights of the user groups or of individual users can be defined from an essential right on through to a status-dependent right that relates to a single information unit.

In the invention, specific user roles are distinguished, which can be expanded or redefined application-specifically. The information manager is the administrator of the full installation and use of the invention. The Information manager is responsible for the implementation of the requirements in entire system including specification and modification of the modeling capabilities described above. The Information manager has "all rights."

An editor is the person responsible for the data. The editor researches the necessary content in the editorial language according to the structures of the information units. The Editor has write rights in the editorial language.

The translation manager administers the planning, coordination, and control of the translation orders and the handling of translation data. The Translation manager has write rights in the specified target languages.

The editorial process commences when the editor researches and populates any content of the information units. The specific information units the for which the editor is responsible can be specified via the user model to any desired degree of granularity including a single information unit. The degree of division of labor for a project undertaken using the invention depends on the complexity of the product and the philosophy of the editorial process. In the preferred approach information units are populated at the location where the information arises or is first generated. That is, technical data is documented by the design engineer; problem solutions by service personnel.

Via an editorial thread, formulation guidelines (e.g. direct or indirect address for instructions) are specified so that a uniform style for the description of content is guaranteed. With the conclusion of editing of an information unit, the editor can identify the processing state by setting a status. With this setting the degree of maturity of this information unit in the database is exposed to every participant that has any read or write rights with respect to that data. Depending on the status, additional editing steps can be commenced, such as the linguistic or professional checking of the content or translation or publication of the content.

The translation process occurs when the defined information units from the database are output in the form of translation files for the translator. Based on the intelligence in the database, the data can be prepared optimally for translation with the help of translation memory systems as are known in the art. Depending on the content structure, all information units are put into a uniform translation structure so that the steps required in the translation process for data handling can be automated. The flow of the translation process therefore concentrates on translation and eliminates or minimizes other data management functions.

If the translated information units are imported into the invention's database again, clear language pairs arise. This means that it is possible to tell at any time which text statuses of an information unit belong together in the editorial and target languages. Overall, for the control of the translation process, the invention offers several functional controls. The first is the planning state. In the current database, there is a check before editing is completed as to which information units have been changed substantially in the source language and therefore must also be translated into the planned target language. This permits the responsible user to estimate the translation effort required early in the process.

Next, a translation request can be generated. From the database, the precise information units are combined into a translation order that must still be translated for a concrete publication order. The information units required for translation can either be output together as a translation file (e.g. uniform style) or divided up into several self-contained packets (e.g. parallel, and therefore faster processing).

After the granting of a translation order, it is possible to check which translations have not yet been delivered for the upcoming publication. This function is helpful for schedule monitoring in case of parallel translation by several translators.

Already-ordered translations can be canceled again at any time in the database if a translation is no longer necessary.

The invention facilitates increased efficiency through pre-translation. In case of changes in the source language, the invention can pre-translate the data from the previous language pair automatically. Thus the data already in the target language that has not changed from the previous language pair is entered.

Finally the translated information units are re-imported and taken over into the database.

The invention provides a robust quality assurance capability that includes all necessary functions for a complete documentation process from editorial collection of the information units to their management and translation on through to their publication. In connection with the intelligent database, quality-assurance functions can be used across the entire documentation process; these functions frequently have a direct influence on the reduction of costs.

Terminology and orthography checking functions insure consistency and compliance with pre-determined standards. In addition to an online orthography checking, with which the invention marks typographical errors in the text, the invention can also be linked with the a terminology database in which synonymous, impermissible terms can be managed to produce the correct term. The invention can access this knowledge and mark impermissible terms during editorial work. The editor can replace the marked terms with the correct terms. With the strict use of terminology during editorial work, the described content is clear and consistent and translation quality is improved by control of standardized equivalents.

The invention also enhances quality by providing automated formulation consultation. The same content may be described in many different contexts (e.g. loosen the screws . . . ). Since the same content can be expressed with different formulations, there are often several formulations in a database that are also translated differently. By analyzing usage within the existing database, the invention can present to the editor, in a context-sensitive manner within in a consultation window, all previously-used formulations. The editor can directly import one of the suggested formulations or use the existing formulations as a guide in describing new content, thereby assuring consistency of style with the existing formulations. Each formulation imported for reuse saves translation effort and costs since this material may have been translated into the target language in connection with its prior usage.

The invention enforces a high degree of data quality in the editorial process. The intelligence in the database is only as good as the collected content. The content represents the intrinsic value in an information system. Therefore, the invention offers the user numerous quality-assurance functions for the input of high-quality information. Due to the content-oriented information structure described above, the editor is presented with a pre-determined outline of the information to be populated. The user can receive explanations of the individual elements in an information structure at any time during the editing process, as the structural elements and relationships are fully documented and assessable by means of the editing software. The invention checks whether the editor has actually populated the existing information elements with content. The editing software actively draws the editor's attention is to empty data elements in the database. Only the editor can decide if an unnecessary, optional element should be removed from the database or whether it should be populated with required information. Finally, the invention also checks the quality of the links defined in an information unit. This means that if links were defined in an information unit, the invention checks whether the reference targets of those links still exist in the database.

Because information may be revised in the course of managing the data through the cycle from initial input to final publication, it is important to protect certain categories of information from intentional or inadvertent changes that occur in the downstream processes. Particular types of information (e.g. measurements or address information) is very sensitive; it can easily be changed during the translation process, in the course of recalculation into another measurement system, by replacement of the decimal separator, by change in the number-separating character or in translation of a proper noun, such as street name.

With the invention these types of information components (e.g. address information) can be deliberately protected so as to be immutable in the translation process. The translator can read this information in context while undertaking a translation, but cannot edit or translate it.

The invention also takes over the conversion of punctuation so that no processing is necessary in the translation process.

Finally, the conversion of measurements into other measurement systems can also be done automatically by the invention using pre-determined conversion tables and assignment of different units to different targeted users based on language or geography.

A key feature of the invention that ensures consistent high quality and consistency in multi-lingual document management is the protection of language pairs. A language pair is a very high-quality piece of information in the database. With a language pair, there exists an appropriate translation for an information unit in the editorial language, that is, the same content is available in different languages. Each change to an information unit that belongs to a language pair causes the dissolution of the language pair and requires a new translation. Therefore, the invention always informs the user if a contemplated change will dissolve a language pair in the target language upon completion of the action, such as a manual editorial change or the importation of revised material.

Overall quality and consistency of information is facilitated by the invention's ability to actively monitor the entire database. The Information manager provides functions for monitoring the quality of the entire database. In a pre-determined sequence, these monitor functions check each information unit or each required document in the database and flag possible errors for manual review and correction. The automated checking functions will flag a possible error if (1) the information unit is not a valid instance for the specified document type definition; (2) validation rules for content syntax are checked; (3) the information unit contains broken links; (4) documents linked in the database (e.g. figures, third-party documents, or specifications) do not exist as files; and (5) there are documents in the database that are not linked with the database.

The gathering, entry, and editing of information about a product may occur simultaneously in several locations. The coalesced information from all locations together forms the entire database. With the invention the user can compare the database from two different locations manually or automatically (time-controlled) at any time. Thus the user has access to the complete database in all locations and can link the documented information units with one another.

The invention does not limit the user to pre-existing or pre-determined structures but readily accommodates new requirements and ideas. With the invention a user may undertake significant innovations while preserving the value of effort from the past. Newly collected information may be linked with an existing database by making the necessary adjustments to structures and then updating the database with a corresponding conversion instruction. Thus the invention grows with the user's demands.

We claim:

1. A method for managing information through structured storage and retrieval of data relating to a predetermined target domain from a multi-dimensional database comprising the steps of:
- structuring a multi-axis database in which intersecting database axes locate unique matrix addresses for individual information units by:
  - creating a first database axis for a first predetermined class of data relating to domain information types;
  - defining a series of information-type identifiers for the classification of domain data;
  - defining sub-categories for selected information-type identifiers in an unlimited tree structure based on parent-child relationships;
  - determining which information type identifiers are category headings not associated with specific data;
  - creating an information type definition that describes the data categories required to populate each information type
  - identifying information type definitions that may have multiple entries requiring pool anchors;
  - creating domain templates that define the structure of each information type on the first database axis by:
    - identifying characteristics of each information type;
    - identifying anchor points for each information type to which a link is permitted to obtain data for reuse; and
    - identifying link points for each information type from which links are permitted and limiting connectivity of the link points to predetermined sources for that information type;
  - creating a second database axis for a second predetermined class of data relating to domain objects;
  - defining a series of object identifiers for the classification of domain data;
  - defining sub-categories for object identifiers in a tree structure of pre-determined depth based on parent-child relationships;
  - creating a third database axis for a third predetermined class of data relating to variants of the objects and subcategories of objects
  - defining a series of variant identifiers for the classification of object data;
  - defining sub-categories for variant identifiers in a tree structure of pre-determined depth based on parent-child relationships; and
  - creating a fourth database axis for a fourth predetermined class of data relating to languages to facilitate translation using automated and semi-automated methods;
- defining a hierarchical set of rules and exceptions thereto to govern the data that may be stored in any given information unit or address range of information units, by performing at least one of the following steps:
  - determining which address ranges within the matrix define locations of domain data;
  - locking address ranges that do not define domain data locations;
  - creating user role definitions that control users' ability to read, add, modify, or delete data; and
  - creating of rules governing layer links;
- applying the hierarchical set of rules to address ranges;
- assigning attributes to information units based on criteria selected to measure information quality;
- assigning status identifiers to information units to identify workflow status and history with respect to content and review status of data;
- tracking the addition, deletion, modification, or change in status of data so that documents published using the information units are populated by linking to the most recent available data compliant with a predetermined status identifier; and
- creating at least one publication definition by:
  - determining the methods by which an end user may desire to access the data;
  - preparing a predefined layout to meet end user access requirements; and
  - mapping at least one information unit to the predefined layout for export in at least one predetermined file format.

2. The method of claim 1 further comprising the step of creating a fifth database axis wherein at least one anchor point acts as a pool anchor to permit linking to a plurality of information units.

3. The method of claim 2 further comprising pool anchors linking multiple data elements to a single information unit.

4. The method of claim 1 wherein the hierarchical rules are applied commencing with a selected address range level and determining whether child levels will be included to create a complete tree within the multi-dimensional database.

5. The method of claim 1 wherein manual entry, update status, conversion status, importation process, translation, or other source factors are included in the criteria for quality measurement.

6. The method of claim 1 further comprising the creation of links from a first range of matrix addresses to a second range of matrix addresses thereby allowing projection of the information units contained in the first range from the first range to an analogous block of projected information in the second range.

7. The method of claim 6 further comprising the step of creating a copy of a projected information unit in the second range that inherits structural elements of the projected information unit and overriding the link to the first range and editing the newly created copy of the information unit in the second range.

8. The method of claim 7 further comprising the step of editing of the projected information by applying rules of language translation from a translation memory to the projected information.

9. The method of claim 1 further comprising the step of populating the defined information units by retrieving data from the intersection of the defined database axes.

10. The method of claim 9, further comprising the step of populating a plurality of information units with predetermined data, such information units optionally including a pool anchor to serve as a linking point for data included in the plurality of information units.

11. The method of claim 1 further comprising the step of real-time retrieval of previously entered information during user input using fuzzy-logic to locate contextually consistent prior data to permit a user to select all or portions of the previously entered information to facilitate reuse of existing data during new data entry, to ensure consistency of expression, and to facilitate automated translation.

12. The method of claim 11 in which context is narrowed by comparing similarity of information type definition and determining the semantic distance between elements in the multi-dimensional database matrix based on axes and level within any sub-trees on the axes using predetermined distance parameters based on definitions of axis entries.

13. The method of claim 1 further comprising the step of importing data headings from an associated database axis for inclusion in the publication.

14. A method for managing information through structured storage and retrieval of data relating to a predetermined target domain from a multi-dimensional database comprising the steps of:
   structuring a multi-axis database in which intersecting database axes locate unique matrix addresses for individual information units and the entries of each axis are hierarchically organized;
   defining address ranges in the matrix, whereby a single address range is defined by:
      selecting an entry point on each of the hierarchically structured matrix axes; and
      setting an n-dimensional address range on n-axes of the matrix by determining whether the hierarchical subordinated axis entry points are part of the address range;
   defining a hierarchical set of rules and exceptions thereto to govern the data that may be stored in any given information unit or address range of information units;
   applying the hierarchical set of rules to the address ranges;
   tracking the addition, deletion, modification, or change in status of data so that documents published using the information units are populated by linking to the most recent available data compliant with a predetermined status identifier;
   wherein the multi-axis database is structured by: defining a series of information-type identifiers for the classification of domain data;
   defining sub-categories for selected information-type identifiers in an unlimited tree structure based on parent-child relationships;
   determining which information type identifiers are category headings not associated with specific data;
   creating an information type definition that describes the data categories required to populate each information type; identifying information type definitions that may have multiple entries requiring pool anchors;
   creating domain templates that define the structure of each information type on the first database axis;
   creating a second database axis for a second predetermined class of data relating to domain objects;
   defining a series of object identifiers for the classification of domain data;
   defining sub-categories for object identifiers in a tree structure of pre-determined depth based on parent-child relationships;
   creating a third database axis for a third predetermined class of data relating to variants of the objects and sub-categories of objects;
   defining a series of variant identifiers for the classification of object data;
   defining sub-categories for variant identifiers in a tree structure of pre-determined depth based on parent-child relationships; and
   creating a fourth database axis for a fourth predetermined class of data relating to languages to facilitate translation using automated and semi-automated methods.

15. The method of claim 14 wherein the information type definition is created by:
   identifying characteristics of each information type;
   identifying anchor points for each information type to which a link is permitted to obtain data for reuse; and
   identifying link points for each information type from which links are permitted and limiting connectivity of the link points to predetermined sources for that information type.

16. The method of claim 14 wherein the hierarchical set of rules and exceptions are defined by performing at least one of the following steps:
   determining which address ranges within the matrix define locations of domain data;
   locking address ranges that do not define domain data locations;
   creating user role definitions that control users' ability to read, add, modify, or delete data; and
   creating of rules governing layer links.

17. The method of claim 14 further comprising the steps of:
   assigning attributes to information units based on criteria selected to measure information quality; and
   assigning status identifiers to information units to identify workflow status and history with respect to content and review status of data.

18. The method of claim 14 further comprising the step of creating at least one publication definition by:
   determining the methods by which an end user may desire to access the data;
   preparing a predefined layout to meet end user access requirements; and
   mapping at least one information unit to the predefined layout for export in at least one predetermined file format.

19. The method of claim 14 further comprising the step of creating a database axis wherein at least one anchor point acts as a pool anchor to permit storage of a plurality of information units.

20. The method of claim 19 further comprising linking to part of an information unit, a complete Information unit, or an address range.

21. The method of claim 17 wherein manual entry, update status, conversion status, importation process, translation, or other source factors are included in the criteria for quality measurement.

22. The method of claim 14 further comprising the creation of links from a first range of matrix addresses to a second range of matrix addresses thereby allowing projection of the information units contained in the first range from the first range to an analogous block of projected information in the second range.

23. The method of claim 22 further comprising the step of creating a virtual copy of a projected information unit in the second range that inherits structural elements of the projected information unit and overriding the link to the first range and viewing the newly created virtual copy of the information unit in the second range.

24. The method of claim 23 further comprising the step of editing of the projected information by applying rules of language translation from a translation memory to the projected information.

25. The method of claim 14 further comprising the step of populating the defined information units.

26. The method of claim 25 further comprising the step of populating a plurality of information units with predetermined data, such information units optionally including a pool anchor to serve as a linking point for data included in the plurality of information units.

27. The method of claim 14 further comprising the step of real-time retrieval of previously entered information during user input using fuzzy-logic to locate contextually consistent prior data to permit a user to select all or portions of the previously entered information to facilitate reuse of existing data during new data entry, to ensure consistency of expression, and to facilitate automated translation.

28. The method of claim 27 wherein context is narrowed by comparing similarity of information type definition and determining the semantic distance between elements in the multi-dimensional database matrix based on axes and level within any sub-trees on the axes using predetermined distance parameters based on definitions of axis entries.

29. The method of claim 18 further comprising the step of importing data headings from an associated database axis for inclusion in the publication.

* * * * *